United States Patent
Ma et al.

(10) Patent No.: US 11,930,483 B2
(45) Date of Patent: Mar. 12, 2024

(54) SCRAMBLING METHODS FOR PIGGYBACKED DOWNLINK CONTROL INFORMATION

(71) Applicant: QUALCOMM Incorporated, San Diego, CA (US)

(72) Inventors: Jun Ma, San Diego, CA (US); Xiaoxia Zhang, San Diego, CA (US); Jing Sun, San Diego, CA (US); Qiang Wu, San Diego, CA (US); Tao Luo, San Diego, CA (US); Iyab Issam Sakhnini, San Diego, CA (US); Mehmet Izzet Gurelli, San Diego, CA (US); Ahmed Abdelaziz Ibrahim Abdelaziz Zewail, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 276 days.

(21) Appl. No.: 17/228,508

(22) Filed: Apr. 12, 2021

(65) Prior Publication Data

US 2021/0345337 A1   Nov. 4, 2021

Related U.S. Application Data

(60) Provisional application No. 63/017,525, filed on Apr. 29, 2020.

(51) Int. Cl.
*H04W 72/04* (2023.01)
*H04W 72/044* (2023.01)
*H04W 72/12* (2023.01)
*H04W 72/23* (2023.01)

(52) U.S. Cl.
CPC ....... *H04W 72/0466* (2013.01); *H04W 72/23* (2023.01)

(58) Field of Classification Search
CPC ................. H04W 72/0466; H04W 72/23
See application file for complete search history.

(56) References Cited

U.S. PATENT DOCUMENTS

| | | | |
|---|---|---|---|
| RE48,280 E * | 10/2020 | Ma | H04W 16/04 |
| 2013/0294366 A1 * | 11/2013 | Papasakellariou | H04L 27/2613 370/329 |
| 2018/0092071 A1 * | 3/2018 | Dinan | H04L 1/1819 |
| 2018/0110084 A1 * | 4/2018 | Dinan | H04W 48/12 |
| 2018/0124753 A1 * | 5/2018 | Sun | H04L 1/0088 |

(Continued)

*Primary Examiner* — Hoang-Chuong Q Vu
(74) *Attorney, Agent, or Firm* — Holland & Hart LLP

(57) ABSTRACT

Methods, systems, and devices for wireless communications are described. For instance, a user equipment (UE) may receive, from a base station, a first downlink control information message in a downlink control channel, the first downlink control information message scheduling first resources of a downlink shared channel for a second downlink control information message. The UE may identify a first, UE-specific scrambling sequence for the second downlink control information message. The UE may receive, from the base station, the second downlink control information message based on the first scrambling sequence, the second downlink control information message scheduling second resources of the downlink shared channel for a data message. The UE may receive, from the base station, the data message in the second resources scheduled by the second downlink control information message.

16 Claims, 18 Drawing Sheets

(56) References Cited

U.S. PATENT DOCUMENTS

| | | | |
|---|---|---|---|
| 2019/0393987 A1* | 12/2019 | Hong | H04L 1/0061 |
| 2020/0100219 A1* | 3/2020 | Takeda | H04W 72/23 |
| 2020/0162212 A1* | 5/2020 | Liu | H04L 1/1642 |
| 2020/0304159 A1* | 9/2020 | Liao | H04J 11/0036 |
| 2020/0374800 A1* | 11/2020 | Dinan | H04W 72/1273 |
| 2020/0396760 A1* | 12/2020 | Yi | H04L 1/1864 |
| 2021/0045098 A1* | 2/2021 | Bi | H04W 72/23 |
| 2021/0204308 A1* | 7/2021 | Takeda | H04W 72/1273 |
| 2021/0259006 A1* | 8/2021 | Yoshioka | H04L 1/1861 |
| 2022/0408384 A1* | 12/2022 | Määttanen | H04W 56/005 |

\* cited by examiner

SCRAMBLING METHODS FOR PIGGYBACKED DOWNLINK CONTROL INFORMATION

CROSS REFERENCE

The present Application for Patent claims the benefit of U.S. Provisional Patent Application No. 63/017,525 by MA et al., entitled "SCRAMBLING METHODS FOR PIGGYBACKED DOWNLINK CONTROL INFORMATION," filed Apr. 29, 2020, assigned to the assignee hereof, and expressly incorporated by reference herein.

FIELD OF TECHNOLOGY

The following relates generally to wireless communications and more specifically to scrambling methods for piggybacked downlink control information.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some examples, a base station may transmit a downlink control information (DCI) message to a UE during a control channel monitoring occasion. The DCI message may schedule the UE to receive a downlink shared channel message. In some examples, the base station may scramble each of the DCI message and the downlink shared channel message prior to transmitting the DCI message and the downlink shared channel message. Conventional techniques for scrambling the DCI message and the downlink shared channel message may result in inefficient processing or use of resources, in some situations.

SUMMARY

The described techniques relate to improved methods, systems, devices, and apparatuses that support scrambling methods for piggybacked downlink control information. Generally, the described techniques provide for methods by which a base station may scramble piggybacked downlink control information. For instance, a user equipment (UE) may monitor a downlink control channel for downlink control information (DCI) from a base station. The UE may receive a first DCI message in the downlink control channel scheduling first resources of a downlink shared channel. In some cases, a second DCI message for the UE may be present in the scheduled first resources. The UE may identify a first, UE-specific scrambling sequence for the second DCI message. The UE may receive, from the base station, the second DCI message based on the first scrambling sequence, the second DCI message scheduling second resources of the downlink shared channel for a data message. The UE may receive, from the base station, the data message in the second resources scheduled by the second DCI message.

A method for wireless communication at a UE is described. The method may include receiving a first downlink control information message in a downlink control channel, the first downlink control information message scheduling first resources of a downlink shared channel for a second downlink control information message, identifying a first, UE-specific scrambling sequence for the second downlink control information message, receiving the second downlink control information message based on the first scrambling sequence, the second downlink control information message scheduling second resources of the downlink shared channel for a data message, and receiving the data message in the second resources scheduled by the second downlink control information message.

An apparatus for wireless communication at a UE is described. The apparatus may include a processor, memory in electronic communication with the processor, and instructions stored in the memory. The instructions may be executable by the processor to cause the apparatus to receive a first downlink control information message in a downlink control channel, the first downlink control information message scheduling first resources of a downlink shared channel for a second downlink control information message, identify a first, UE-specific scrambling sequence for the second downlink control information message, receive the second downlink control information message based on the first scrambling sequence, the second downlink control information message scheduling second resources of the downlink shared channel for a data message, and receive the data message in the second resources scheduled by the second downlink control information message.

Another apparatus for wireless communication at a UE is described. The apparatus may include means for receiving a first downlink control information message in a downlink control channel, the first downlink control information message scheduling first resources of a downlink shared channel for a second downlink control information message, means for identifying a first, UE-specific scrambling sequence for the second downlink control information message, means for receiving the second downlink control information message based on the first scrambling sequence, the second downlink control information message scheduling second resources of the downlink shared channel for a data message, and means for receiving the data message in the second resources scheduled by the second downlink control information message.

A non-transitory computer-readable medium storing code for wireless communication at a UE is described. The code may include instructions executable by a processor to receive a first downlink control information message in a downlink control channel, the first downlink control information message scheduling first resources of a downlink shared channel for a second downlink control information message, identify a first, UE-specific scrambling sequence for the second downlink control information message, receive the second downlink control information message based on the first scrambling sequence, the second downlink control information message scheduling second resources of the downlink shared channel for a data message, and receive the data message in the second resources scheduled by the second downlink control information message.

In some examples of the method, apparatuses, and non-transitory computer-readable medium described herein, receiving the second downlink control information message may include operations, features, means, or instructions for descrambling the set of coded bits to obtain a descrambled set of coded bits, and demultiplexing the descrambled set of coded bits to obtain the second downlink control information message.

In some examples of the method, apparatuses, and non-transitory computer-readable medium described herein, the first downlink control information message also schedules the first resources for a second data message, and where the demultiplexing the descrambled set of coded bits further may include operations, features, means, or instructions for demultiplexing the descrambled set of coded bits received in the first resources to obtain a descrambled second data message.

In some examples of the method, apparatuses, and non-transitory computer-readable medium described herein, the first scrambling sequence may be associated with a cell radio network temporary identifier of the UE, a configured scheduling radio network temporary identifier of the UE, or a modulation coding scheme radio network temporary identifier of the UE.

In some examples of the method, apparatuses, and non-transitory computer-readable medium described herein, receiving the second downlink control information message may include operations, features, means, or instructions for demultiplexing the set of coded bits to obtain a first subset of the set of coded bits, and descrambling the first subset of the set of coded bits using the first, UE-specific scrambling sequence to obtain the second downlink control information message.

In some examples of the method, apparatuses, and non-transitory computer-readable medium described herein, demultiplexing the set of coded bits may include operations, features, means, or instructions for demultiplexing the set of coded bits to obtain the first subset of the set of coded bits and a second subset of the set of coded bits.

Some examples of the method, apparatuses, and non-transitory computer-readable medium described herein may further include operations, features, means, or instructions for descrambling the second subset of the set of coded bits using a second scrambling sequence to obtain a third downlink control information message.

In some examples of the method, apparatuses, and non-transitory computer-readable medium described herein, the third downlink control information message schedules third resources of the downlink shared channel for a second data message.

In some examples of the method, apparatuses, and non-transitory computer-readable medium described herein, the third downlink control information message includes a medium reservation indication associated with the UE and at least one additional UE.

In some examples of the method, apparatuses, and non-transitory computer-readable medium described herein, the first scrambling sequence and the second scrambling sequence may be initialized using a same identifier of the UE.

In some examples of the method, apparatuses, and non-transitory computer-readable medium described herein, the second scrambling sequence may be initialized based on a common identifier associated with the UE and one or more additional UEs.

Some examples of the method, apparatuses, and non-transitory computer-readable medium described herein may further include operations, features, means, or instructions for descrambling the second subset of the set of coded bits using a second, UE-specific scrambling sequence to obtain the second data message.

In some examples of the method, apparatuses, and non-transitory computer-readable medium described herein, the first scrambling sequence and the second scrambling sequence may be initialized using a same identifier of the UE.

In some examples of the method, apparatuses, and non-transitory computer-readable medium described herein, the first scrambling sequence and the second scrambling sequence may be initialized using different identifiers of the UE.

A method for wireless communication at a base station is described. The method may include transmitting a first downlink control information message in a downlink control channel to a first UE, the first downlink control information message scheduling first resources of a downlink shared channel for a second downlink control information message for the first UE, identifying a first scrambling sequence for the second downlink control information message, the first scrambling sequence initialized based on an identifier of the first UE, transmitting the second downlink control information message based on the first scrambling sequence, the second downlink control information message scheduling second resources of the downlink shared channel for a data message for the first UE, and transmitting the data message in the second resources scheduled by the second downlink control information message.

An apparatus for wireless communication at a base station is described. The apparatus may include a processor, memory in electronic communication with the processor, and instructions stored in the memory. The instructions may be executable by the processor to cause the apparatus to transmit a first downlink control information message in a downlink control channel to a first UE, the first downlink control information message scheduling first resources of a downlink shared channel for a second downlink control information message for the first UE, identify a first scrambling sequence for the second downlink control information message, the first scrambling sequence initialized based on an identifier of the first UE, transmit the second downlink control information message based on the first scrambling sequence, the second downlink control information message scheduling second resources of the downlink shared channel for a data message for the first UE, and transmit the data message in the second resources scheduled by the second downlink control information message.

Another apparatus for wireless communication at a base station is described. The apparatus may include means for transmitting a first downlink control information message in a downlink control channel to a first UE, the first downlink control information message scheduling first resources of a downlink shared channel for a second downlink control information message for the first UE, means for identifying a first scrambling sequence for the second downlink control information message, the first scrambling sequence initialized based on an identifier of the first UE, means for transmitting the second downlink control information message based on the first scrambling sequence, the second downlink control information message scheduling second resources of the downlink shared channel for a data message for the first UE, and means for transmitting the data message in the second resources scheduled by the second downlink control information message.

A non-transitory computer-readable medium storing code for wireless communication at a base station is described. The code may include instructions executable by a processor to transmit a first downlink control information message in a downlink control channel to a first UE, the first downlink control information message scheduling first resources of a downlink shared channel for a second downlink control information message for the first UE, identify a first scrambling sequence for the second downlink control information message, the first scrambling sequence initialized based on an identifier of the first UE, transmit the second downlink control information message based on the first scrambling sequence, the second downlink control information message scheduling second resources of the downlink shared channel for a data message for the first UE, and transmit the data message in the second resources scheduled by the second downlink control information message.

Some examples of the method, apparatuses, and non-transitory computer-readable medium described herein may further include operations, features, means, or instructions for concatenating the second downlink control information message with one or more additional downlink control messages to form a set of downlink control information messages, and scrambling the set of downlink control information messages according to the first scrambling sequence, where transmitting the second downlink control information message includes transmitting the set of scrambled downlink control information messages.

Some examples of the method, apparatuses, and non-transitory computer-readable medium described herein may further include operations, features, means, or instructions for multiplexing the second downlink control information message with a second data message for the first UE, and scrambling the second downlink control information message and the second data message according to the first scrambling sequence based on the multiplexing, where the transmitting includes transmitting the scrambled second data message in the first resources.

In some examples of the method, apparatuses, and non-transitory computer-readable medium described herein, the first scrambling sequence may be associated with a cell radio network temporary identifier of the first UE, a configured scheduling radio network temporary identifier of the first UE, or a modulation coding scheme radio network temporary identifier of the first UE.

Some examples of the method, apparatuses, and non-transitory computer-readable medium described herein may further include operations, features, means, or instructions for scrambling the second downlink control information message according to the first scrambling sequence, scrambling one or more additional downlink control information messages according to respective scrambling sequences, and concatenating the scrambled second downlink control information message with the scrambled one or more additional downlink control information messages to form a set of scrambled downlink control information messages, where transmitting the second downlink control information message includes transmitting the set of scrambled downlink control information messages.

In some examples of the method, apparatuses, and non-transitory computer-readable medium described herein, the one or more additional downlink control information messages include a third downlink control information message, and where the scrambling may include operations, features, means, or instructions for scrambling the third downlink control information message according to a second scrambling sequence.

In some examples of the method, apparatuses, and non-transitory computer-readable medium described herein, the third downlink control information message includes a medium reservation indication associated with the first UE and at least one additional UE.

In some examples of the method, apparatuses, and non-transitory computer-readable medium described herein, the third downlink control information message may be for a second UE and the second scrambling sequence may be initialized based on an identifier of the second UE.

In some examples of the method, apparatuses, and non-transitory computer-readable medium described herein, the first scrambling sequence and the second scrambling sequence may be initialized using the identifier of the first UE.

In some examples of the method, apparatuses, and non-transitory computer-readable medium described herein, the second scrambling sequence may be initialized based on a common identifier associated with the first UE and one or more additional UEs.

Some examples of the method, apparatuses, and non-transitory computer-readable medium described herein may further include operations, features, means, or instructions for scrambling the second downlink control information message according to the first scrambling sequence, scrambling a second data message according to a second scrambling sequence, and multiplexing the scrambled second data message with the scrambled second downlink control information message, where the transmitting includes transmitting the scrambled second data message in the first resources.

In some examples of the method, apparatuses, and non-transitory computer-readable medium described herein, the second scrambling sequence may be initialized based on the identifier of the first UE.

In some examples of the method, apparatuses, and non-transitory computer-readable medium described herein, the second scrambling sequence may be initialized based on a second identifier of the first UE.

In some examples of the method, apparatuses, and non-transitory computer-readable medium described herein, the second scrambling sequence may be initialized based on a second identifier of a second UE.

DETAILED DESCRIPTION

Figure 1:
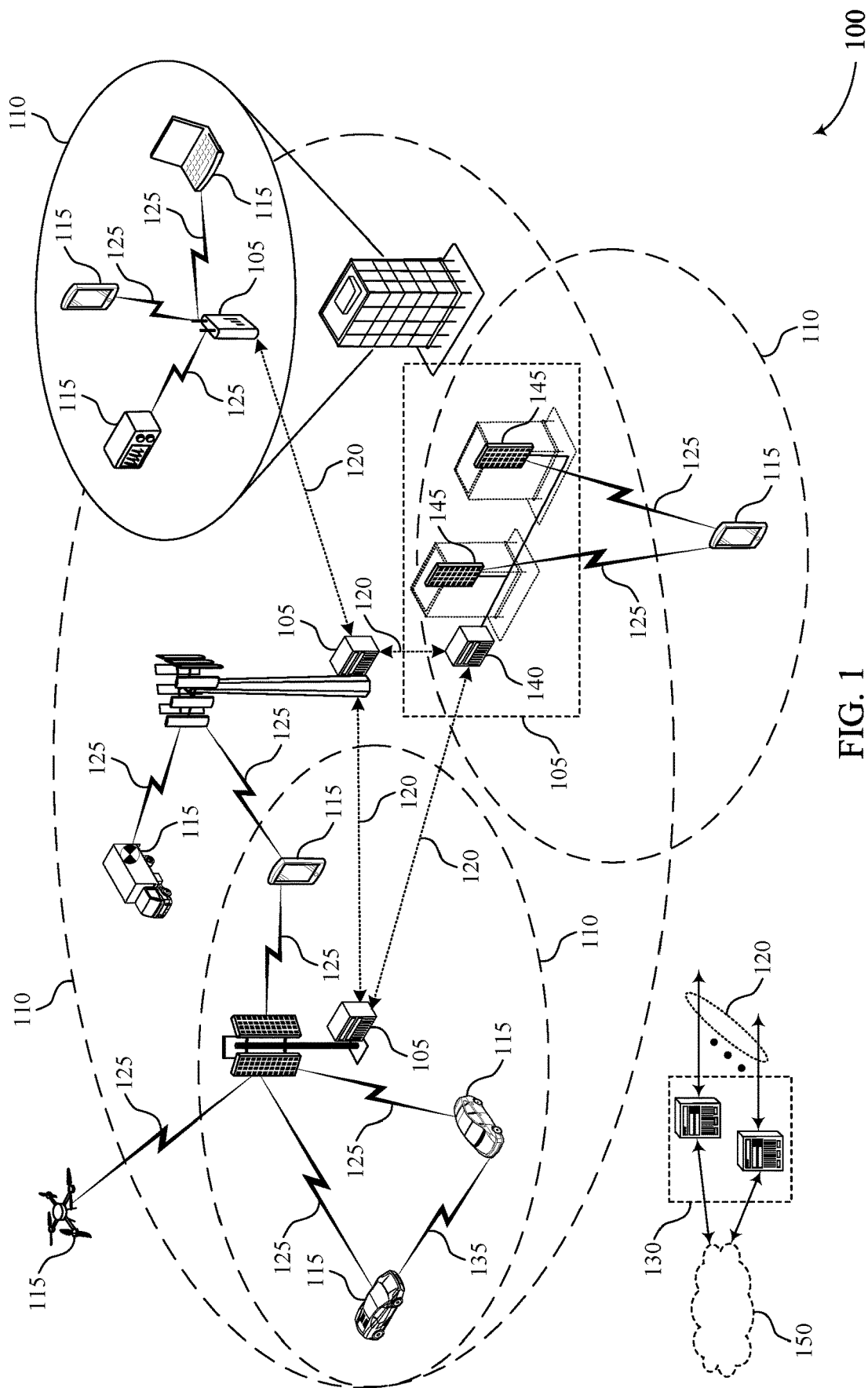
FIG. 1 illustrates an example of a wireless communications system that supports scrambling methods for piggybacked downlink control information in accordance with aspects of the present disclosure.

Some wireless communications systems may use piggybacked downlink control information (DCI) messages to enable a user equipment (UEs) to reduce the frequency of control channel monitoring at the UEs. For example, a UE may monitor control channel resources in periodic slots for DCI messages and may refrain from monitoring control channel resources in the slots in between each periodic slot. To maintain a number of opportunities for the UE to receive DCI messages, a base station may piggyback DCI messages to downlink shared channel resources (e.g., resources of a physical downlink shared channel PDSCH)). A DCI message received by a UE in control channel resources may schedule the UE to receive one or more additional DCI messages (e.g., with or without an accompanying data message) in the downlink shared channel resources. Piggybacking DCI on a downlink shared channel in this manner may reduce control channel monitoring density for the UE, which may support reduced power consumption at the UE.

In some cases, the base station may scramble the one or more additional DCI messages piggybacked on the downlink shared channel. Additionally, the base station may scramble one or more downlink shared channel messages of the downlink shared channel onto which the one or more additional DCI messages are piggybacked. In either case, the base station may perform scrambling to mitigate intercell interference. Aspects of the disclosure relate to methods by which a UE may perform scrambling for the DCI messages and for the other one or more downlink shared channel messages.

In some examples, the base station may multiplex the one or more additional DCI messages with the one or more downlink shared channel messages and may scramble the multiplexed messages according to a UE-specific scrambling sequence. The base station may transmit the scrambled messages as a set of coded bits. Upon receiving the set of coded bits, the UE may descramble the set of coded bits according to the UE-specific scrambling sequence and may demultiplex the descrambled set of coded bits after performing the descrambling to obtain the one or more additional DCI messages and the one or more downlink shared channel messages.

In other examples, the base station may scramble each of the one or more additional DCI messages and the one or more downlink shared channel messages and may multiplex the scrambled one or more additional DCI messages and scrambled one or more downlink shared channel messages. The base station may transmit the multiplexed messages as a set of coded bits. In such cases, the UE may demultiplex the set of coded bits to obtain a first subset of coded bits for each of the one or more additional DCI messages and a second subset of coded bits for each of the one or more downlink shared channel messages. The UE may descramble each first subset of bits to obtain the one or more additional DCI messages and may descramble each second subset of bits to obtain the one or more downlink shared channel messages.

Aspects of the disclosure are initially described in the context of wireless communications systems. Additional aspects of the disclosure are described in the context of an additional wireless communications system, a resource map, and scrambling schemes. Aspects of the disclosure are further illustrated by and described with reference to apparatus diagrams, system diagrams, and flowcharts that relate to scrambling methods for piggybacked downlink control information.

FIG. 1 illustrates an example of a wireless communications system 100 that supports scrambling methods for piggybacked downlink control information in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE- SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be deployed alongside other wireless networks, and certain devices may connect to multiple networks concurrently. Other example wireless networks include a wireless local area network (WLAN), such as a Wi-Fi (i.e., Institute of Electrical and Electronics Engineers (IEEE) 802.11), which may include an access point (AP) that may communicate with one or more wireless or mobile devices. The AP may be coupled to a network, such as the Internet, and may enable a mobile device to communicate via the network (or communicate with other devices coupled to the access point). A wireless device may communicate with a network device bi-directionally. For example, in a WLAN, a device may communicate with an associated AP via downlink (e.g., the communication link from the AP to the device) and uplink (e.g., the communication link from the device to the AP). A wireless personal area network (PAN), which may include a Bluetooth connection, may provide for short range wireless connections between two or more paired wireless devices. For example, wireless devices such as cellular phones may utilize wireless PAN communications to exchange information such as audio signals with wireless headsets.

To support sending multiple DCI messages to a single UE 115 while reducing the control channel monitoring density at the UE 115, the wireless communications system 100 may support intermittent control channel monitoring and DCI piggybacking in a data channel. For example, a base station 105 may transmit, to a UE 115, a DCI message in a slot via a control channel (e.g., a physical downlink control channel (PDCCH)). The control channel DCI message may be referred to as a $DCI_{CORESET}$, as the UE 115 may monitor for the DCI message in a CORESET within the control channel. The UE 115 may monitor the control channel for a $DCI_{CORESET}$ in intermittent control channel monitoring occasions. This intermittent monitoring may support improved micro-sleep for the UE 115, as the UE 115 may power down into a low power or inactive state when not monitoring the control channel or scheduled for data communications.

To support DCI piggybacking, the $DCI_{CORESET}$ may include allocation information for the UE 115 to receive one or more additional DCI messages in the slot via a data channel. A data channel DCI message may be referred to as a $DCI_{PDSCH}$. In some cases, the $DCI_{CORESET}$ may additionally include information common to the scheduled $DCI_{PDSCH}$ messages (e.g., to reduce any redundant payload information for the $DCI_{PDSCH}$ messages). Each $DCI_{PDSCH}$ may include a grant (e.g., a downlink data grant, an uplink data grant, or some other grant). Further, in some cases, the $DCI_{CORESET}$ may additionally include a grant. For example, the base station 105 may include a downlink grant in the control channel DCI message and may transmit the additional DCI messages to the UE 115 along with data for the UE 115 in a data channel. As such, the UE 115 may receive the downlink grant for the data and determine how to receive the data and DCI messages based on the downlink grant, the allocation information for the DCI messages, and demodulation reference signal (DMRS) information for the data channel. However, in some other examples, the base station 105 may prioritize a data transmission to a different UE 115 in the slot. As such, the UE 115 may not receive a downlink grant for a data message in the slot.

Generally, the techniques described herein provide for methods by which a base station may scramble piggybacked downlink control information. For instance, a UE 115 may receive, from a base station 105, a first downlink control information message in a downlink control channel, the first downlink control information message scheduling first resources of a downlink shared channel for a second downlink control information message. The UE 115 may identify a first, UE-specific scrambling sequence for the second downlink control information message. The UE 115 may receive, from the base station 105, the second downlink control information message based on the first scrambling sequence, the second downlink control information message scheduling second resources of the downlink shared channel for a data message. The UE 115 may receive, from the base station 105, the data message in the second resources scheduled by the second downlink control information message.

Figure 2:
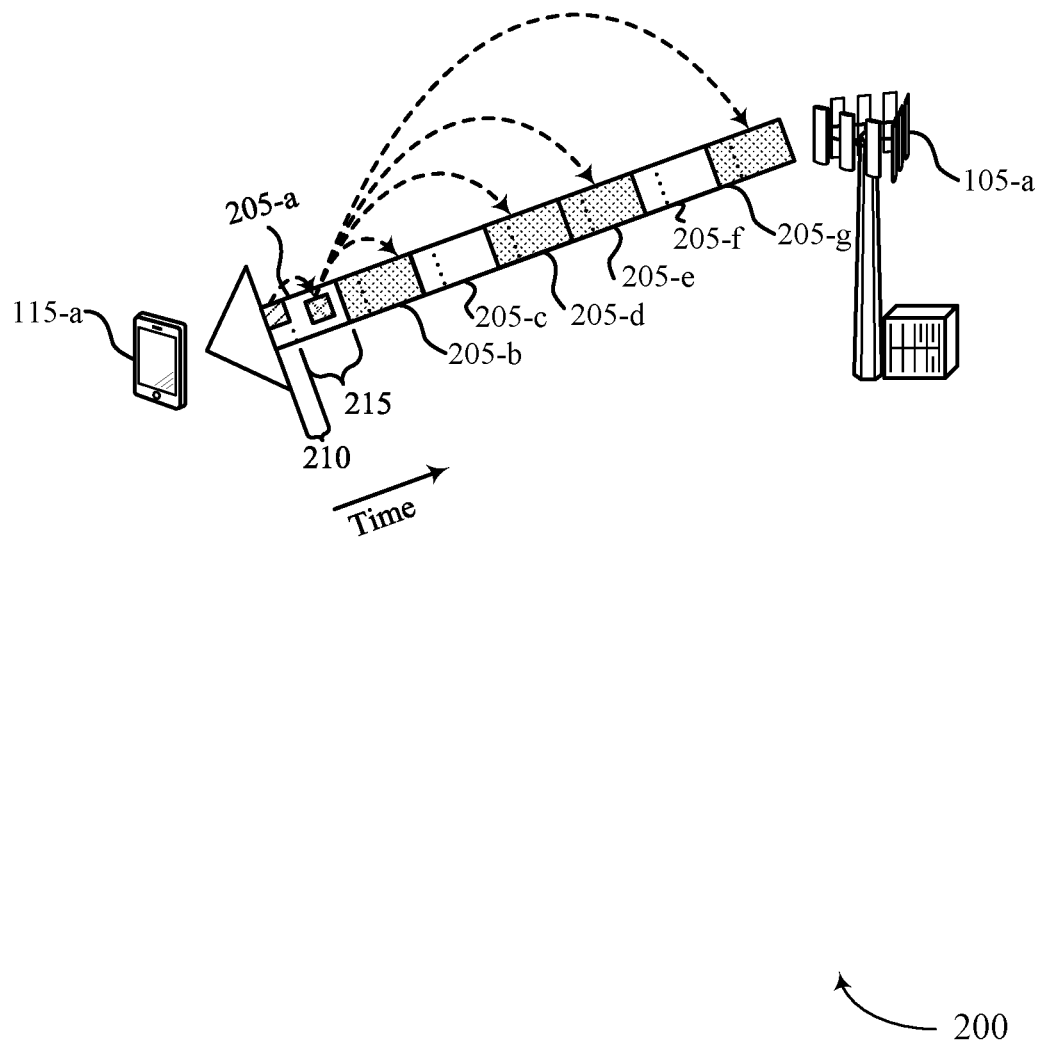
FIG. 2 illustrates an example of a wireless communications system that supports scrambling methods for piggybacked downlink control information in accordance with aspects of the present disclosure.

FIG. 2 illustrates an example of a wireless communications system 200 that supports scrambling methods for piggybacked downlink control information in accordance with aspects of the present disclosure. In some examples, wireless communications system 200 may implement aspects of wireless communications system 100. For instance, wireless communications system 200 may include a UE 115-a, which may be an example of a UE 115 as described with reference to FIG. 1, and a base station 105-*a*, which may be an example of a base station 105 as described with reference to FIG. 1.

Base station 105-*a* may communicate with UE 115-*a* over one or more slots 205, where each slot 205 may include one or more symbols. Each slot 205 may include a control region 210 and a data region 215. In some examples, base station 105-*a* may transmit a DCI message 220 to UE 115-*a* in a control region 210 of a slot 205. For instance, in the present example, base station 105-*a* may transmit a DCI message 220 to UE 115-*a* in the control region 210 of slot 205-*a*. The DCI message 220 may schedule one or more DCI messages 225 in the data region 215 of the slot 205 in which the DCI message 220 is received. For instance, in the present example, the DCI message 220 received in slot 205-*a* may schedule one or more DCI messages 225 in the data region 215 of slot 205-*a*. The one or more DCI messages 225 may be piggybacked on a shared channel resource in the data region 215 (e.g., resources of a PDSCH). In such cases, the one or more DCI messages 225 may be multiplexed with one or more downlink shared channel messages.

Figure 3:
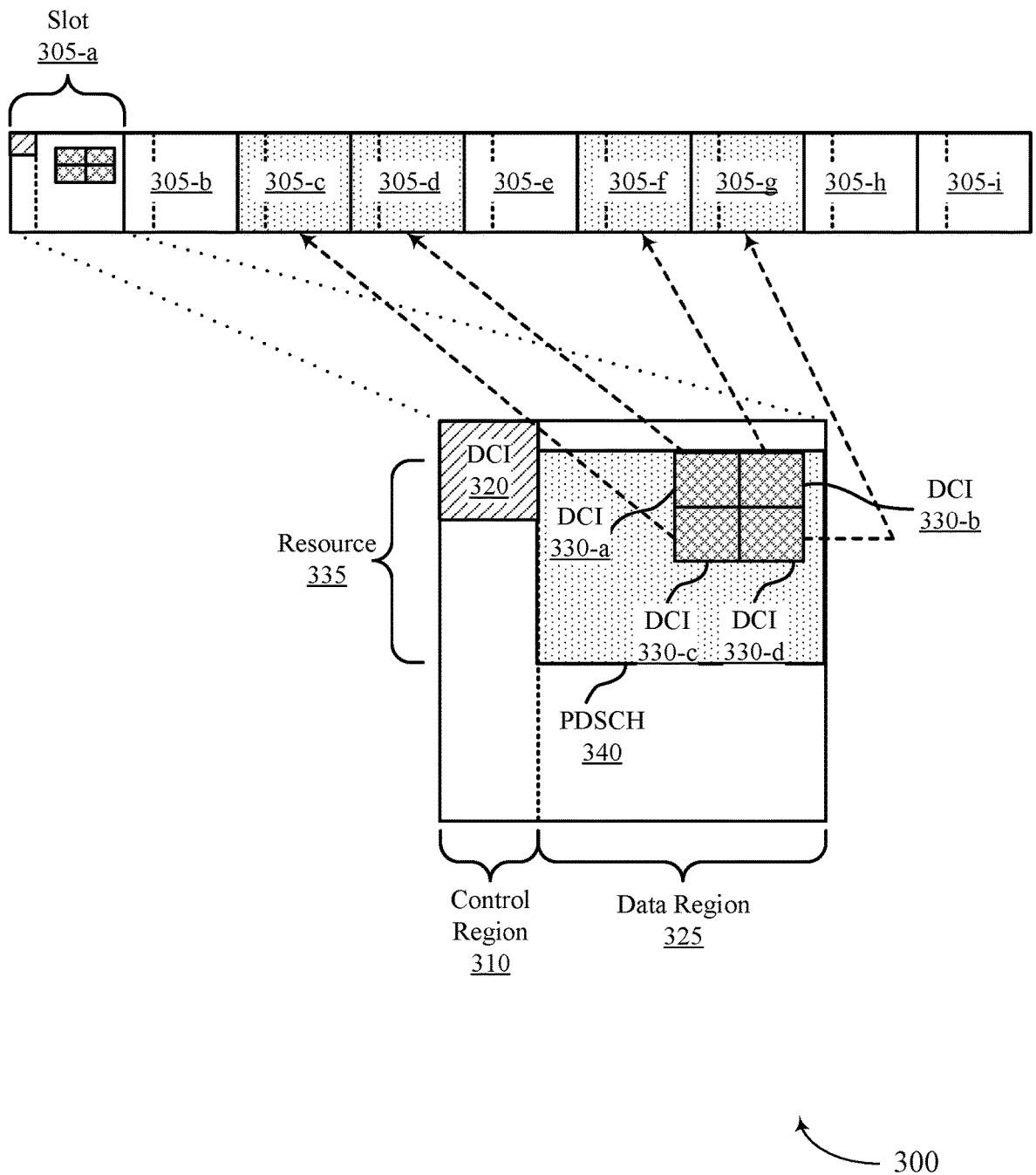
FIG. 3 illustrates an example of a resource map that supports scrambling methods for piggybacked downlink control information in accordance with aspects of the present disclosure.

The one or more DCI messages 225 may, in turn, schedule data transmissions from base station 105-*a* (e.g., downlink data transmissions, such as PDSCH transmissions) or to base station 105-*a* (e.g., uplink data transmissions, such as a physical uplink shared channel (PUSCH) transmissions) in one or more corresponding slots 205. For instance, a first DCI message 225 received in the data region 215 of slot 205-*a* may schedule a first downlink data transmission in slot 205-*b*; a second DCI message 225 received in the data region 215 of slot 205-*a* may schedule a second downlink data transmission in slot 205-*d*; a third DCI message 225 in the data region 215 of slot 205-*a* may schedule a third downlink data transmission in slot 205-*e*; and a fourth DCI message 225 in the data region 215 of slot 205-*a* may schedule a fourth downlink data transmission. The first, second, third, and fourth DCI messages 225 may be contiguous in frequency or time with at least one other of the first, second, third, and fourth DCI messages 225. In some cases, a single DCI message 225 may schedule resources of more than one slot 205. FIG. 3 may provide more details about the layout of the resources that convey DCI messages 225.

In some examples, base station 105-*a* may scramble the one or more DCI messages 225 prior to transmitting them. Scrambling the one or more DCI messages 225 may involve multiplexing the DCI messages 225 with one or more downlink shared channel messages and scrambling the multiplexed messages according to a same UE-specific scrambling sequence. For instance, the one or more DCI messages 225 may be scrambled by a downlink shared channel (e.g., a PDSCH) scrambling sequence seeded by cell radio network temporary identifier (C-RNTI), a configured scheduling RNTI (CS-RNTI), or a modulation coding scheme RNTI (MCS-RNTI). In cases where the one or more DCI messages 225 includes multiple DCI messages 225, base station 105-*a* may concatenate the DCI messages 225 together prior to multiplexing.

Base station 105-*a* may transmit the scrambled messages as a set of coded bits. Upon receiving the set of coded bits, UE 115-*a* may descramble the set of coded bits according to the UE-specific scrambling sequence and may demultiplex the descrambled set of coded bits after performing the descrambling to obtain the one or more DCI messages 225 and the one or more downlink shared channel messages. In cases where the one or more DCI messages 225 includes multiple DCI messages 225, UE 115-*a* may segment the DCI messages 225 after performing demultiplexing. An example of this scrambling scheme may be described elsewhere herein, for example, with reference to FIG. 4.

Alternatively, base station 105-*a* may scramble each of the one or more DCI messages 225 and the one or more downlink shared channel messages and may multiplex the scrambled one or more DCI messages 225 and scrambled one or more downlink shared channel messages. The one or more DCI messages 225 may be scrambled according to one or more scrambling sequences seeded by C-RNTI and the one or more downlink shared channel messages may be scrambled according to one or more scrambling sequences depending on a downlink shared channel configuration (e.g., scrambling sequences seeded by C-RNTI, CS-RNTI, or MCS-C-RNTI). Base station 105-*a* may transmit the multiplexed messages as a set of coded bits. In such cases, UE 115-*a* may demultiplex the set of coded bits to obtain a first subset of coded bits for each of the one or more DCI messages 225 and a second subset of coded bits for each of the one or more downlink shared channel messages. UE 115-*a* may descramble each first subset of bits to obtain the one or more DCI messages 225 and may descramble each second subset of bits to obtain the one or more downlink shared channel messages. An example of this scrambling scheme may be described herein, for example, with reference to FIG. 5.

In cases where a DCI message 225 and the one or more downlink shared channel messages correspond to a same RNTI, the same scrambling sequence may be used to scramble the DCI message 225 and the one or more downlink shared channel messages. Alternatively, each of the DCI message 225 and the one or more downlink shared channel messages may have different scrambling sequences seeded by a same or different RNTI.

In some cases, the one or more DCI messages 225 and the one or more downlink shared channel messages may target multiple UEs 115. In one example, if base station 105-*a* is to transmit a first DCI message 225 to a first UE 115 and one or more downlink shared channel messages to a second UE 115, base station 105-*a* may scramble the DCI message 225 according to a scrambling sequence corresponding to an RNTI of the first UE 115 and may scramble the one or more downlink shared channel messages according to a scrambling sequence corresponding to an RNTI of the second UE 115. In another example, if base station 105-*a* is to transmit multiple DCI messages 225 to multiple UEs 115, base station 105-*a* may scramble each DCI message 225 according to a scrambling sequence corresponding to an RNTI of the UE 115 to which the DCI message 225 is to be sent. In either case, base station 105-*a* may scramble the one or more downlink shared channel messages according to an RNTI of the UE 115 that received a DCI message 220 scheduling the downlink shared channel resources onto which the one or more DCI messages 225 are multiplexed (e.g., the host UE 115). If the one or more DCI messages 225 include a DCI message 225 for the host UE 115, base station 105-*a* may scramble the DCI message 225 according to a scrambling sequence corresponding to an RNTI of the host UE 115. In some cases, the one or more downlink shared channel messages may be directed to a single UE 115 (e.g., may contain information for one UE 115) whereas each of the one or more DCI messages 225 may be directed to multiple UEs 115 (e.g., may contain information for multiple UEs 115). If a DCI message 225 is directed to multiple UEs, the DCI message 225 may be referred to as a multi-UE DCI message 225.

In some cases, a DCI message 225 of the one or more DCI messages 225 may target a group of nodes (e.g., may contain information for a group of UEs 115). For example, the DCI message 225 may include a medium reservation indication and may be readable by multiple nodes including a group of UEs 115. When the DCI message 225 targets the group of nodes, base station 105-a may scramble the DCI message 225 according to a scrambling sequence corresponding to the group of nodes (e.g., a scrambling sequence identified by the group of nodes). The scrambling sequence for such a DCI message 225 may be different from the scrambling sequence used to scramble the one or more downlink shared channel messages.

In cases where the one or more downlink shared channel messages and a DCI message 225 have a unified (e.g., same) scrambling sequence, base station 105-a and/or UE 115-a may perform scrambling for the one or more downlink shared channel messages and the DCI message 225 in a manner that is more simplified as compared to individually scrambling the one or more downlink shared channel messages and the DCI message 225. For instance, in such cases, base station 105-a and/or UE 115-a may not reinitiate a scrambling sequence at a boundary (e.g., a time or frequency boundary) of coded bits for the DCI message 225 and coded bits for the one or more downlink shared channel messages. Alternatively, in cases where the one or more downlink shared channel messages and a DCI message 225 have different scrambling sequences, using different scrambling sequences may enable base station 105-a to communicate the one or more shared channel messages to a first UE 115 and the DCI message 225 to a second UE. Additionally, in cases where a first DCI message 225 has a different scrambling sequence from a second DCI message (e.g., due to the UEs 115 corresponding to different RNTIs), using different scrambling sequences may enable base station 105-a to communicate different DCI messages 225 to different UEs 115 in a single downlink shared channel.

FIG. 3 illustrates an example of a resource map 300 that supports scrambling methods for piggybacked downlink control information in accordance with aspects of the present disclosure. In some examples, resource map 300 may be implemented by aspects of wireless communications systems 100 and/or 200. Resource map 300 includes a number of slots 305 in the time domain in which a base station and a UE may communicate (e.g., a base station 105 may transmit downlink messages to a UE 115). A slot 305 may include a control region 310 and a data region 325. The control region 310 may be used by a base station 105 to transmit DCI messages (e.g., DCI message 320), while the data region 325 may be used to transmit data messages and, in some examples, DCI messages 330 piggybacked on a data channel.

A base station 105 may transmit, to a UE 115, a DCI message 320 in the control region 310. The DCI message 320 may include control information, scheduling information, DMRS information, or the like. The scheduling information may indicate that the UE 115 is to communicate in a slot, such as slot 305-a in which the DCI message 320 is received or a subsequent slot 305. In some cases, the base station 105 may piggyback DCI information for the UE 115 on resources assigned to a data region of the UE 115. For example, the base station 105 may transmit the DCI message 320 to the UE 115. The DCI message 320 may indicate scheduling resources 335 in which the UE 115 may receive one or more additional DCI messages 330 in the data region 325 assigned to the UE 115.

The one or more additional DCI messages 330 may include scheduling information for subsequent data communications. The scheduling information may indicate one or more subsequent data regions in which the UE 115 may communicate. For example, DCI message 330-a may schedule the UE 115 to communicate in slot 305-c, DCI message 330-b may schedule the UE 115 to communicate in slot 305-d, DCI message 330-c may schedule the UE 115 to communicate in slot 305-f, and DCI message 330-d may schedule the UE 115 to communicate in slot 305-g. The UE 115 may communicate in each slot as indicated by the received DCI messages 330. Additionally or alternatively, the UE 115 may refrain from communicating in other slots 305 in which the UE 115 is not scheduled to communicate by a DCI message, such as slots 305-b or 305-e. In some cases, other UEs 115 may communicate in these slots 305 (e.g., slots 305 not assigned to the UE 115 or multiplexed in a slot 305 with the UE 115). The UE 115 may periodically monitor for control information. For example, the UE 115 may monitor the control region 310 in slot 305-a to check for scheduling information for slots 305-a through 305-g. The UE 115 may then refrain from monitoring the control regions 310 in slots 305-b through 305-g, and then may monitor the control region 310 in slot 305-h (e.g., based on a static or dynamic periodicity for control channel monitoring). The control region 310 in slot 305-h may schedule data communications for the UE 115 for slot 305-h, slot 305-i, and the subsequent slots until the next control channel monitoring opportunity.

In some examples, the base station 105 may scramble DCI messages 330-a, 330-b, 330-c, and 330-d prior to transmitting them. Scrambling the DCI messages 330-a, 330-b 330-c, and 330-d may involve multiplexing the DCI messages 330-a, 330-b, 330-c, and 330-d with one or more downlink shared channel messages 340 and scrambling the multiplexed messages according to a UE-specific scrambling sequence. The base station 105 may transmit the scrambled messages as a set of coded bits. Upon receiving the set of coded bits, the UE 115 may descramble the set of coded bits according to the UE-specific scrambling sequence and may demultiplex the descrambled set of coded bits after performing the descrambling to obtain DCI messages 330-a, 330-b, 330-c, and 330-d and the one or more downlink shared channel messages 340.

Alternatively, the base station 105 may scramble each of DCI messages 330-a, 330-b, 330-c, and 330-d and the one or more downlink shared channel messages 340 individually and may multiplex the scrambled DCI messages 330-a, 330-b, 330-c, and 330-d and scrambled one or more downlink shared channel messages. The base station 105 may transmit the multiplexed messages as a set of coded bits. In such cases, the UE 115 may demultiplex the set of coded bits to obtain first subsets of coded bits for DCI messages 330-a, 330-b, 330-c, and 330-d (e.g., 4 first subsets of coded bits) and a second subset of coded bits for each of the one or more downlink shared channel messages. The UE 115 may descramble the subsets of coded bits to obtain DCI messages 330-a, 330-b, 330-c, and 330-d and may descramble the second subset of coded bits to obtain the one or more downlink shared channel messages.

In some cases, where at least one of DCI messages 330 is for a UE that is different from a UE for which PDSCH 340 is scheduled (e.g., a host UE 115), separate DCI messages 320 may be used in control region 310. For example, a UE 115 associated with one or more of DCI messages 330 may receive a first $DCI_{CORESET}$ and a UE 115 associated with PDSCH 340 or an additional one or more of DCI messages 330 may receive a second $DCI_{CORESET}$. Alternatively, a single DCI message 320 may be used to schedule DCI messages or PDSCH for multiple UEs 115 (e.g., a single DCI message including multiple resource allocations). A DCI used to schedule DCI messages or PDSCH messages for multiple UEs 115 may be scrambled with a sequence based on (e.g., seeded from) an identifier common to the multiple UEs.

Figure 4:
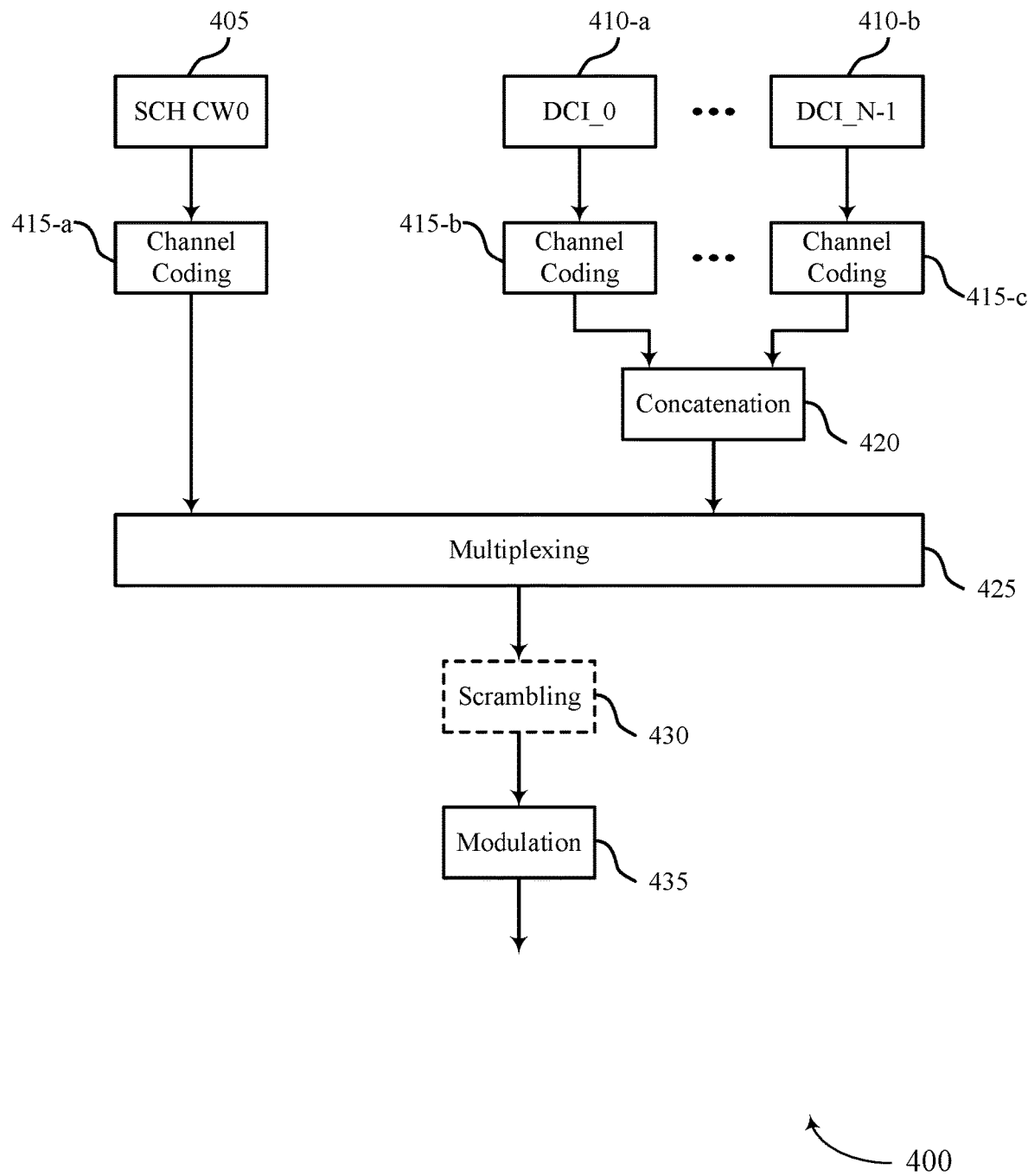
FIG. 4 illustrates an example of a scrambling scheme that supports scrambling methods for piggybacked downlink control information in accordance with aspects of the present disclosure.

FIG. 4 illustrates an example of a scrambling scheme 400 that supports scrambling methods for piggybacked downlink control information in accordance with aspects of the present disclosure. In some examples, scrambling scheme 400 may be implemented by aspects of wireless communications systems 100 and/or 200. For instance, scrambling scheme 400 may represent a process by which a base station 105 may scramble a downlink shared channel message 405 and N DCI messages 410 piggybacked on a downlink shared channel in which the downlink shared channel message 405 resides.

At 415-a, a base station 105 may perform channel coding on the downlink shared channel message 405. Similarly, the base station 105 may perform channel coding for each of the N DCI messages 410. For instance, at 415-b and 415-c, the base station 105 may perform channel coding on a first DCI message 410-a and a second DCI message 410-b to obtain sets of coded bits corresponding to DCI messages 410-a and 410-b. Upon performing channel coding for each of the N DCI messages 410, the base station 105 may concatenate sets of coded bits corresponding to the N channel coded DCI messages 410 together at 420.

At 425, the base station 105 may multiplex the N concatenated DCI messages 410 with the set of coded bits corresponding to channel coded downlink shared channel message 405. At 430, the base station 105 may scramble the multiplexed messages according to a UE-specific scrambling sequence. At 435, the base station 105 may modulate the scrambled multiplexed messages and may transmit the modulated messages to a UE 115.

Figure 5:
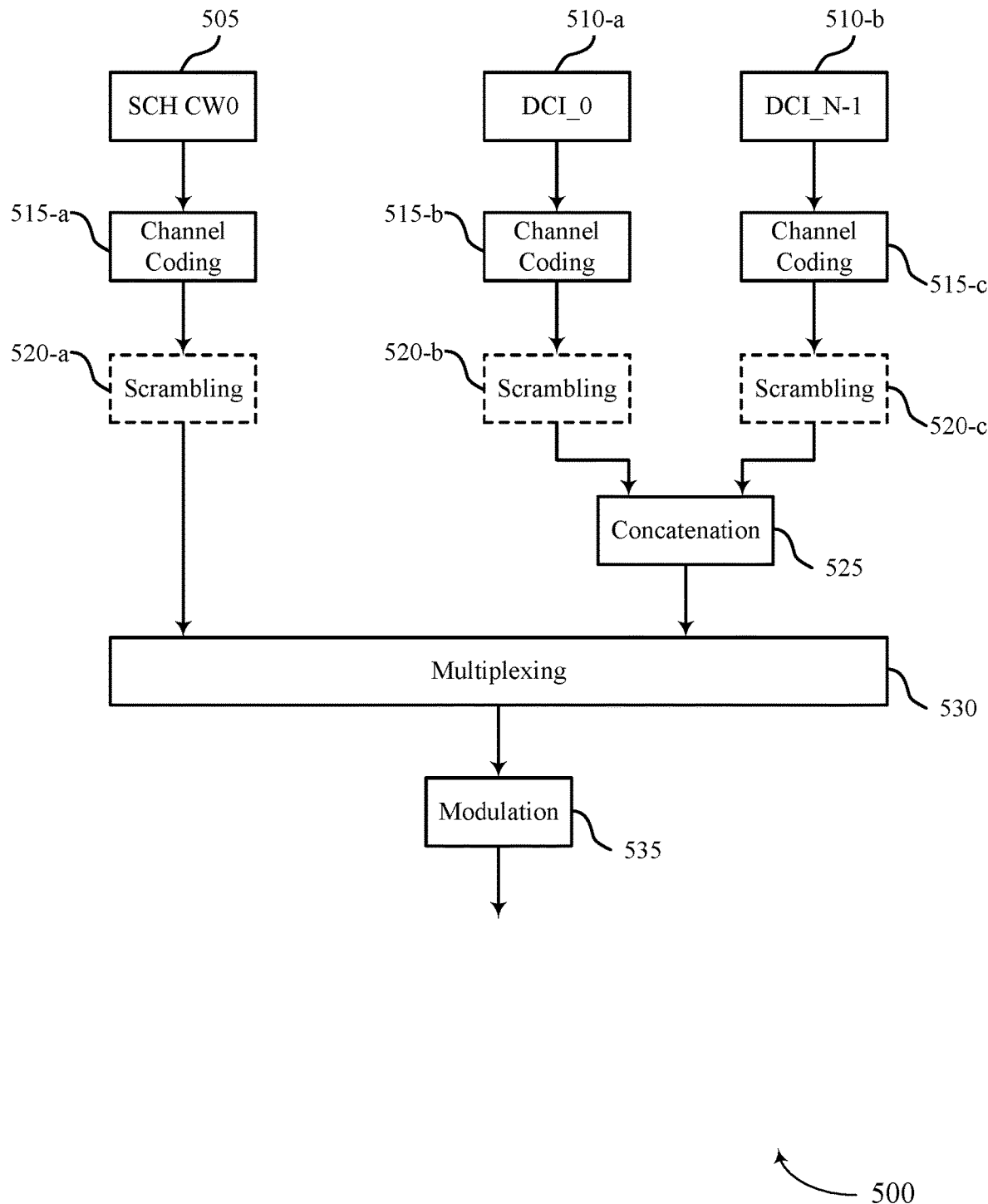
FIG. 5 illustrates an example of a scrambling scheme that supports scrambling methods for piggybacked downlink control information in accordance with aspects of the present disclosure.

FIG. 5 illustrates an example of a scrambling scheme 500 that supports scrambling methods for piggybacked downlink control information in accordance with aspects of the present disclosure. In some examples, scrambling scheme 500 may implement aspects of wireless communications system 100. For instance, scrambling scheme 500 may represent a process by which a base station 105 may scramble a downlink shared channel message 505 and N DCI messages 510 piggybacked on a downlink shared channel in which the downlink shared channel message 505 resides.

At 515-a, a base station 105 may perform channel coding on the downlink shared channel message 505. After performing channel coding, the base station 105 may scramble the downlink shared channel message 505 at 520-a according to a first scrambling sequence. Similarly, the base station 105 may perform channel coding for each of the N DCI messages 510. For instance, at 515-b and 515-c, the base station 105 may perform channel coding on a first DCI message 510-a and a second DCI message 510-b to obtain sets of coded bits. After performing channel coding for a DCI message 510 of the N DCI messages, the base station 105 may perform scrambling on the respective sets of coded bits corresponding to DCI messages 510. For instance, at 520-b, the base station 105 may scramble the set of coded bits corresponding to channel coded DCI message 510-a according to a second scrambling sequence and may scramble the set of coded bits corresponding to channel coded DCI message 510-b according to a third scrambling sequence. Upon performing channel coding for each of the N DCI messages 510, the base station 105 may concatenate the sets of coded bits corresponding to the N scrambled DCI messages 510 together at 525.

At 530, the base station 105 may multiplex the N concatenated and scrambled sets of coded bits corresponding to DCI messages 510 with the set of coded bits corresponding to scrambled downlink shared channel message 505. At 535, the base station 105 may modulate the multiplexed messages and may transmit the modulated messages to a UE 115.

Figure 6:
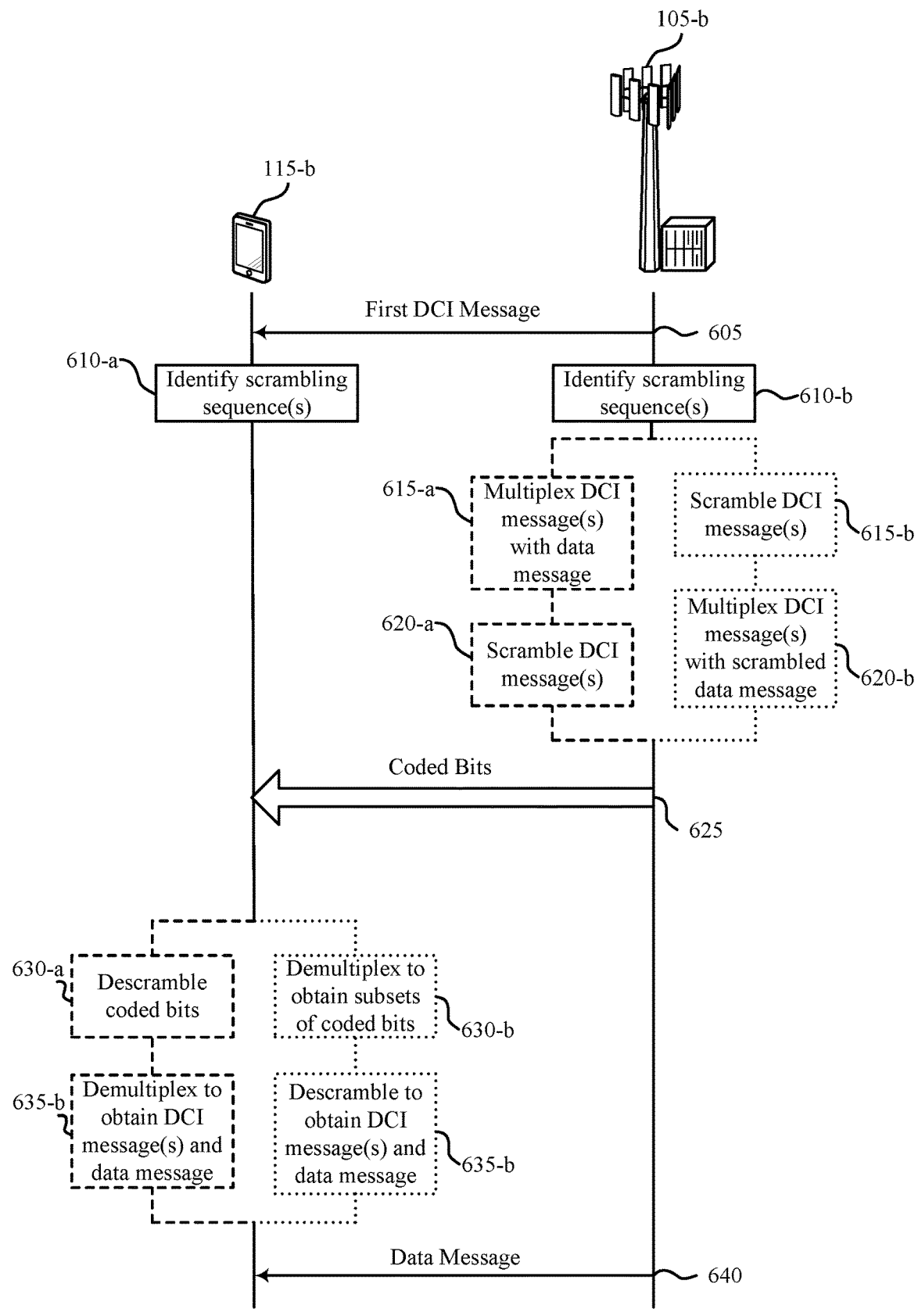
FIG. 6 illustrates an example of a process flow that supports scrambling methods for piggybacked downlink control information in accordance with aspects of the present disclosure.

FIG. 6 illustrates an example of a process flow 600 that supports scrambling methods for piggybacked downlink control information in accordance with aspects of the present disclosure. In some examples, process flow 600 may be implemented by aspects of wireless communications system 100. For instance, process flow 600 may include a UE 115-b, which may be an example of a UE 115 as described with reference to FIG. 1, and a base station 105-b, which may be an example of a base station 105 as described with reference to FIG. 1.

At 605, base station 105-b may transmit a first DCI message in a downlink control channel (e.g., a PDCCH). The first DCI message may schedule first resources of a downlink shared channel for one or more DCI messages (e.g., a set of DCI messages including a second DCI message). In some examples, the first DCI message may also schedule the first resources for a data message.

At 610-a, UE 115-b may identify one or more scrambling sequences for the one or more DCI messages. Similarly, at 610-b, base station 105-b may identify one or more scrambling sequences for the one or more DCI messages. Base station 105-b may initialize some or each scrambling sequence based on an identifier of the UE to which the respective DCI is directed (e.g., some or each scrambling sequence may be a UE-specific scrambling sequence).

At 615-a, base station 105-b may multiplex the one or more DCI messages with the data message. If the one or more DCI messages include more than one DCI message, base station 105-b may concatenate the one or more DCI messages together prior to performing the multiplexing at 615-a. At 620-a, base station 105-b may scramble the one or more DCI messages. Additionally, if base station 105-b performed the multiplexing at 615-b, base station 105-b may scramble the data message. The one or more DCI messages and/or the data message may be scrambled according to a single scrambling sequence that is UE-specific. In some examples, the scrambling sequence may be associated with (e.g., seeded by) a C-RNTI of UE 115-b, a CS-RNTI of UE 115-b, or an MCS-RNTI of UE 115-b.

Alternatively, at 615-b, base station 105-b may scramble each of the one or more DCI messages according to a respective scrambling sequence. For instance, base station 105-b may scramble a first of the one or more DCI messages based on a first scrambling sequence and a second of the one or more DCI messages based on a second scrambling sequence. The first and second scrambling sequence may be initialized using the identifier of UE 115-b. Alternatively, the second scrambling sequence may be based on a common identifier associated with UE 115-b and one or more additional UEs 115. In some examples, after scrambling at 615-b, base station 105-b may concatenate the one or more DCI messages together. In some examples, at least one of the of the one or more DCI messages may include a medium reservation indication associated with UE 115-b and at least one additional UE 115. Additionally or alternatively, at least one of the one or more DCI messages may be for another UE 115 and the scrambling sequence may be initialized based on (e.g., seeded by) an identifier of that UE 115. In some examples, at 615-*b*, base station 105-*b* may scramble the data message according to a respective scrambling sequence. The scrambling sequence for the data message may be based on the identifier of UE 115-*b* used to scramble a first of the one or more DCI messages, based on an identifier of UE 115-*b* used to scramble the first of the one or more DCI messages, or based on an identifier of another UE 115. At 620-*b*, base station 105-*b* may multiplex the scrambled data message with the scrambled one or more DCI messages.

At 625, base station 105-*b* may transmit a set of coded bits in the first resources corresponding to the one or more DCI messages. If base station 105-*b* performed multiplexing (e.g., at 615-*a* or 620-*b*), the set of coded bits may also correspond to the data message. UE 115-*b* may receive the set of coded bits.

At 630-*a*, UE 115-*b* may descramble the set of coded bits to obtain a descrambled set of coded bits. At 635-*a*, UE 115-*b* may demultiplex the descrambled set of coded bits to obtain the one or more DCI messages. At least one of the one or more DCI messages may schedule second resources of the downlink shared channel for a second data message. Additionally, UE 115-*b* may demultiplex the descrambled set of coded bits to obtain the descrambled data message.

Alternatively, at 630-*b*, UE 115-*b* may demultiplex the set of coded bits to obtain one or more subsets of coded bits. At 635-*b*, UE 115-*b* may descramble each of the one or more subsets to obtain a DCI message of the one or more DCI messages or the data message. In a first example, UE 115-*b* may descramble a first subset of the one or more subsets using a first scrambling sequence to obtain a first of the one or more DCI messages and may descramble a second subset of the one or more subsets using a second scrambling sequence to obtain a second of the one or more DCI messages. UE 115-*b* may initialize the first scrambling sequence and the second scrambling sequence using a same identifier of UE 115-*b*. Alternatively, UE 115-*b* may initialize the second scrambling sequence based on a common identifier associated with UE 115-*b* and one or more additional UEs 115-*b*. In a second example, UE 115-*b* may descramble a first subset of the one or more subsets using a first scrambling sequence to obtain a DCI message of the one or more DCI messages and may descramble a second subset of the one or more subsets using a second scrambling sequence to obtain the data message. The first scrambling sequence and the second scrambling sequence may be initialized using the identifier of UE 115-*b*. Alternatively, the first scrambling sequence and the second scrambling sequence may be initialized using different identifiers of UE 115-*b*.

At 640, base station 105-*b* may transmit, in the second resources, the second data message. UE 115-*b* may receive the second data message.

Figure 7:
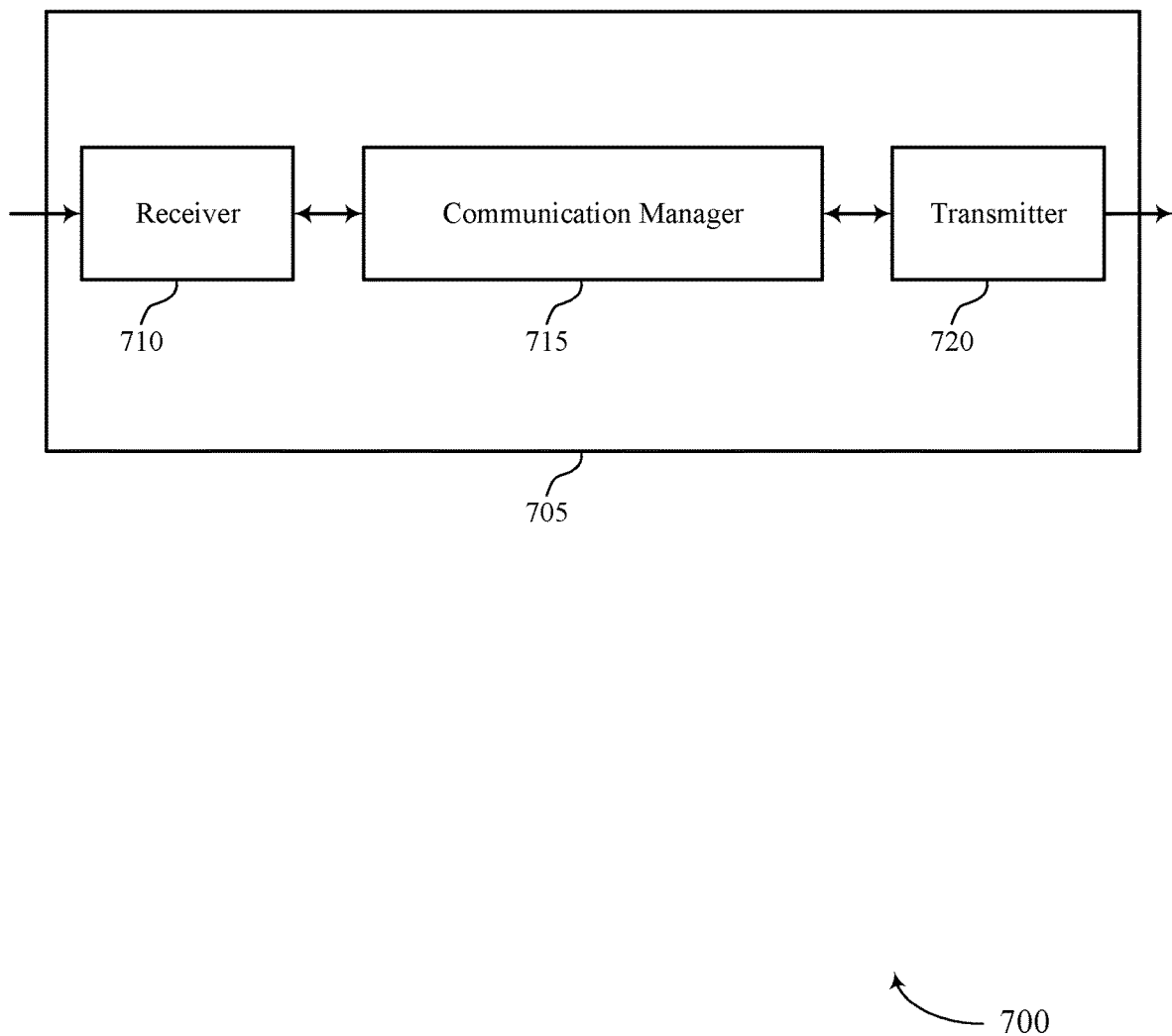
FIGS. 7 and 8 show block diagrams of devices that support scrambling methods for piggybacked downlink control information in accordance with aspects of the present disclosure.

FIG. 7 shows a block diagram 700 of a device 705 that supports scrambling methods for piggybacked downlink control information in accordance with aspects of the present disclosure. The device 705 may be an example of aspects of a UE 115 as described herein. The device 705 may include a receiver 710, a communication manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to scrambling methods for piggybacked downlink control information, etc.). Information may be passed on to other components of the device 705. The receiver 710 may be an example of aspects of the transceiver 1015 described with reference to FIG. 10. The receiver 710 may utilize a single antenna or a set of antennas.

The communication manager 715 may receive a first downlink control information message in a downlink control channel, the first downlink control information message scheduling first resources of a downlink shared channel for a second downlink control information message; identify a first, UE-specific scrambling sequence for the second downlink control information message; receive the second downlink control information message based on the first scrambling sequence, the second downlink control information message scheduling second resources of the downlink shared channel for a data message and; receive the data message in the second resources scheduled by the second downlink control information message. The communication manager 715 may be an example of aspects of the communication manager 1010 described herein.

The communication manager 715, or its sub-components, may be implemented in hardware, code (e.g., software or firmware) executed by a processor, or any combination thereof. If implemented in code executed by a processor, the functions of the communication manager 715, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communication manager 715, or its sub-components, may be physically located at various positions, including being distributed such that portions of functions are implemented at different physical locations by one or more physical components. In some examples, the communication manager 715, or its sub-components, may be a separate and distinct component in accordance with various aspects of the present disclosure. In some examples, the communication manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

By including or configuring the communication manager 715 in accordance with examples as described herein, the device 705 (e.g., a processor controlling or otherwise coupled to the receiver 710, the transmitter 720, the communication manager 715, or a combination thereof) may support techniques for the device 705 to reduce control channel monitoring density while mitigating intercell interference. For instance, by receiving the second downlink control information message over the first resources scheduled by the first downlink control message, the device 705 may reduce control channel monitoring density. Reducing control channel monitoring density may reduce power consumed by the device 705. Additionally, by receiving the second downlink control information message using the first UE-specific scrambling sequence, the device 705 may mitigate intercell interference.

The transmitter 720 may transmit signals generated by other components of the device 705. In some examples, the transmitter 720 may be collocated with a receiver 710 in a transceiver module. For example, the transmitter 720 may be an example of aspects of the transceiver 1015 described with reference to FIG. 10. The transmitter 720 may utilize a single antenna or a set of antennas.

Figure 8:
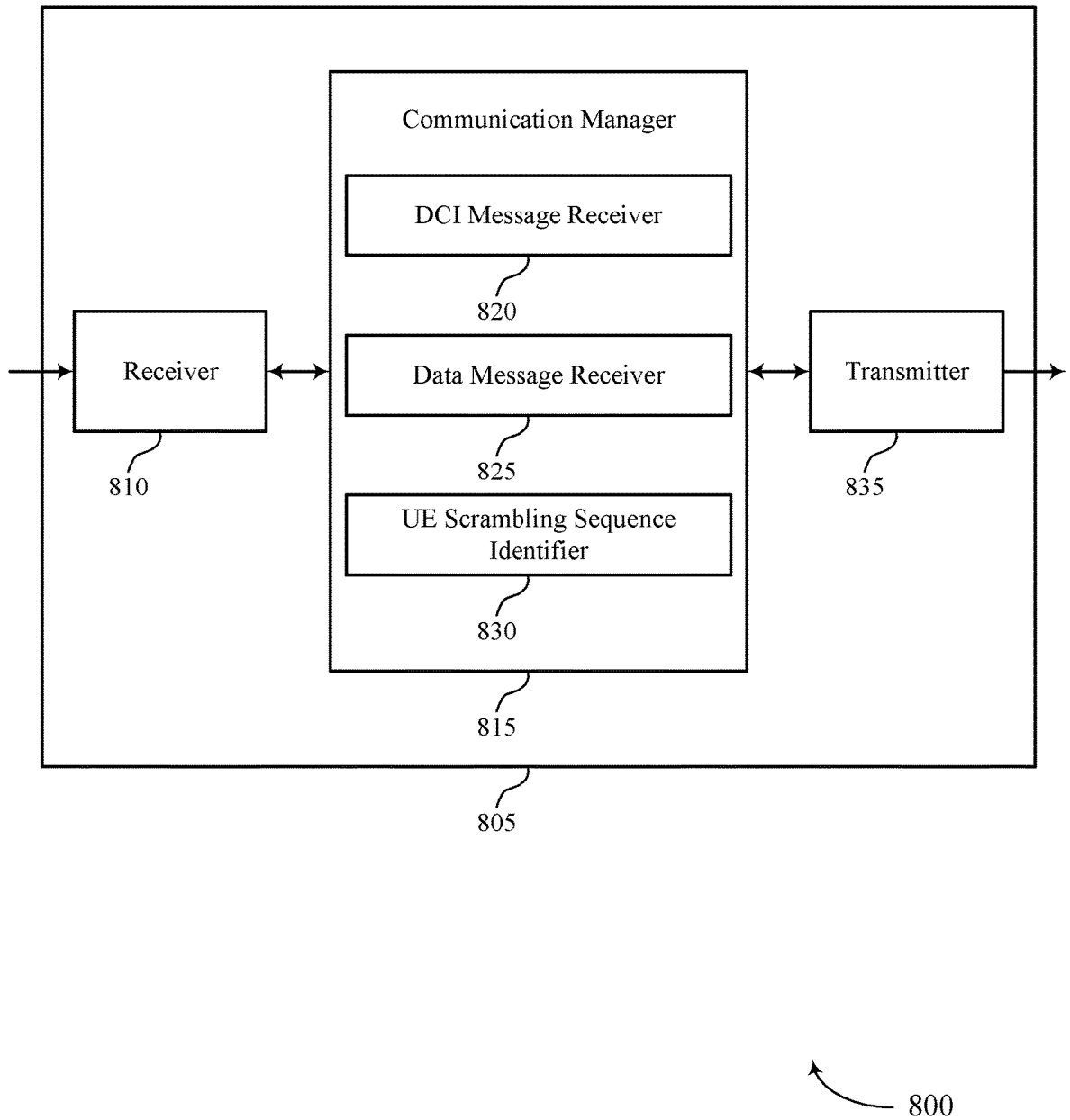

FIG. 8 shows a block diagram 800 of a device 805 that supports scrambling methods for piggybacked downlink control information in accordance with aspects of the present disclosure. The device 805 may be an example of aspects of a device 705, or a UE 115 as described herein. The device 805 may include a receiver 810, a communication manager 815, and a transmitter 835. The device 805 may also include a processor. Each of these components may be in communication with one another (e.g., via one or more buses).

The receiver 810 may receive information such as packets, user data, or control information associated with various information channels (e.g., control channels, data channels, and information related to scrambling methods for piggybacked downlink control information, etc.). Information may be passed on to other components of the device 805. The receiver 810 may be an example of aspects of the transceiver 1015 described with reference to FIG. 10. The receiver 810 may utilize a single antenna or a set of antennas.

The communication manager 815 may be an example of aspects of the communication manager 715 as described herein. The communication manager 815 may include a DCI message receiver 820, a data message receiver 825, and an UE scrambling sequence identifier 830. The communication manager 815 may be an example of aspects of the communication manager 1010 described herein.

The DCI message receiver 820 may receive a first downlink control information message in a downlink control channel, the first downlink control information message scheduling first resources of a downlink shared channel for a second downlink control information message and receive the second downlink control information message based on a first, UE-specific scrambling sequence, the second downlink control information message scheduling second resources of the downlink shared channel for a data message.

The data message receiver 825 may receive the data message in the second resources scheduled by the second downlink control information message.

The UE scrambling sequence identifier 830 may identify the first, UE-specific scrambling sequence for the second downlink control information message.

The transmitter 835 may transmit signals generated by other components of the device 805. In some examples, the transmitter 835 may be collocated with a receiver 810 in a transceiver module. For example, the transmitter 835 may be an example of aspects of the transceiver 1015 described with reference to FIG. 10. The transmitter 835 may utilize a single antenna or a set of antennas.

Figure 9:
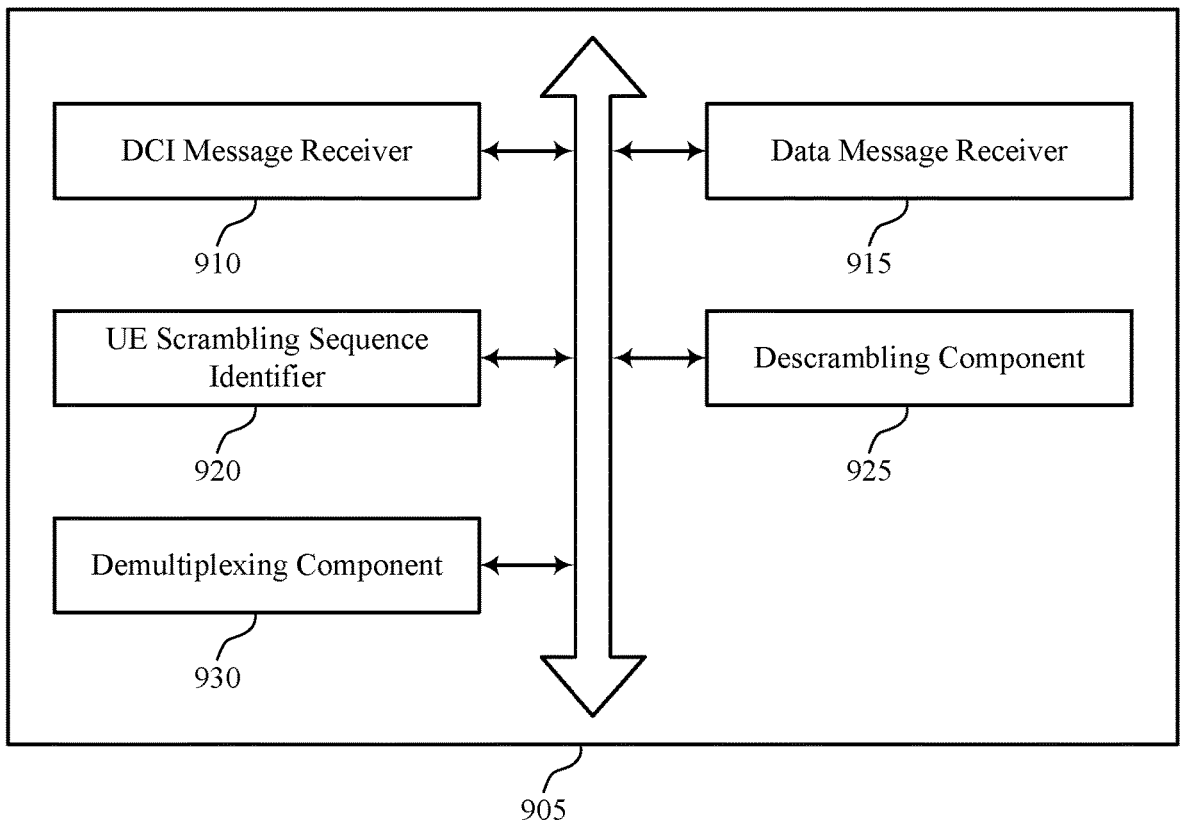
FIG. 9 shows a block diagram of a communication manager that supports scrambling methods for piggybacked downlink control information in accordance with aspects of the present disclosure.

FIG. 9 shows a block diagram 900 of a communication manager 905 that supports scrambling methods for piggybacked downlink control information in accordance with aspects of the present disclosure. The communication manager 905 may be an example of aspects of a communication manager 715, a communication manager 815, or a communication manager 1010 described herein. The communication manager 905 may include a DCI message receiver 910, a data message receiver 915, an UE scrambling sequence identifier 920, a descrambling component 925, and a demultiplexing component 930. Each of these modules may communicate, directly or indirectly, with one another (e.g., via one or more buses).

The DCI message receiver 910 may receive a first downlink control information message in a downlink control channel, the first downlink control information message scheduling first resources of a downlink shared channel for a second downlink control information message. In some examples, the DCI message receiver 910 may receive a second downlink control information message based on a first scrambling sequence, the second downlink control information message scheduling second resources of the downlink shared channel for a data message. In some examples, receiving the second downlink control information message may involve receiving a set of coded bits in the first resources of the downlink shared channel. In some examples, the first downlink control information may also schedule the first resources for a second data message.

The data message receiver 915 may receive the data message in the second resources scheduled by the second downlink control information message.

The UE scrambling sequence identifier 920 may identify the first, UE-specific scrambling sequence for the second downlink control information message. The first scrambling sequence may be associated with a C-RNTI of the UE, a CS-RNTI of the UE, or a MCS-RNTI of the UE.

The descrambling component 925 may descramble the set of coded bits to obtain a descrambled set of coded bits. In some examples, the descrambling component 925 may descramble a first subset of the set of coded bits using the first, UE-specific scrambling sequence to obtain the second downlink control information message. In some examples, the descrambling component 925 may descramble a second subset of the set of coded bits using a second scrambling sequence to obtain a third downlink control information message. In some examples, the third downlink control information message schedules third resources of the downlink shared channel for a second data message. In some examples, the third downlink control information message includes a medium reservation indication associated with the UE and at least one additional UE. In some examples, the first scrambling sequence and the second scrambling sequence may be initialized using the identifier of the first UE. In some examples, the second scrambling sequence may be initialized based on a common identifier associated with the UE and one or more additional UEs.

In some examples, the descrambling component 925 may descramble the second subset of the set of coded bits using a second, UE-specific scrambling sequence to obtain the second data message. In some examples, the first scrambling sequence and the second scrambling sequence may be initialized using the identifier of the first UE. In some examples, the first scrambling sequence and the second scrambling sequence may be initialized using different identifiers of the UE.

The demultiplexing component 930 may demultiplex the descrambled set of coded bits to obtain the second downlink control information message. In some examples, the demultiplexing component 930 may demultiplex the descrambled set of coded bits received in the first resources to obtain a descrambled second data message. In some examples, the demultiplexing component 930 may demultiplex the set of coded bits to obtain the first subset of the set of coded bits. In some examples, the demultiplexing component 930 may demultiplex the set of coded bits to obtain the first subset of the set of coded bits and the second subset of the set of coded bits.

Figure 10:
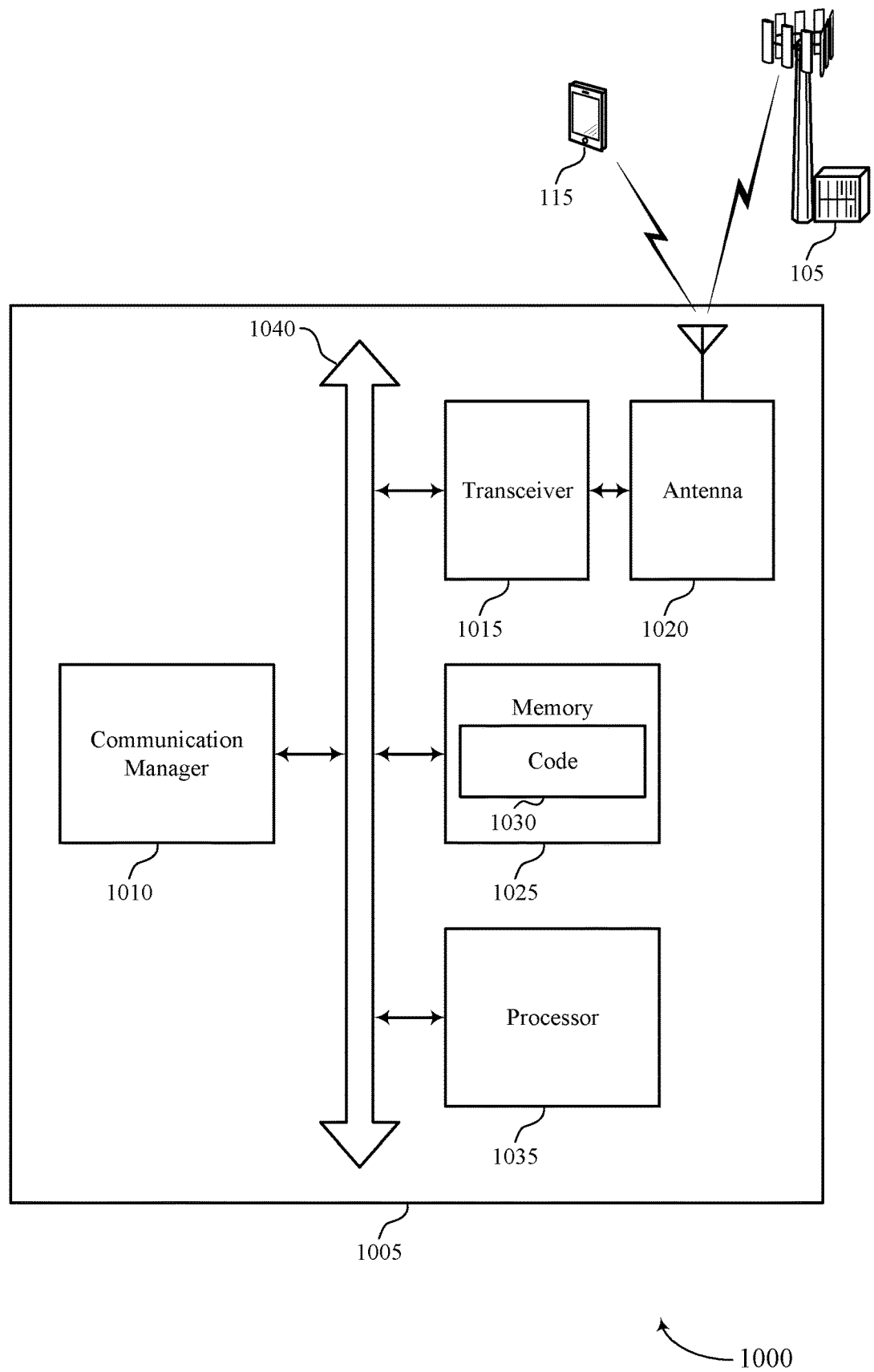
FIG. 10 shows a diagram of a system including a device that supports scrambling methods for piggybacked downlink control information in accordance with aspects of the present disclosure.

FIG. 10 shows a diagram of a system 1000 including a device 1005 that supports scrambling methods for piggybacked downlink control information in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communication manager 1010, a transceiver 1015, an antenna 1020, memory 1025, and a processor 1035. These components may be in electronic communication via one or more buses (e.g., bus 1040).

The communication manager 1010 may receive a first downlink control information message in a downlink control channel, the first downlink control information message scheduling first resources of a downlink shared channel for a second downlink control information message; identify a first, UE-specific scrambling sequence for the second downlink control information message; receive the second downlink control information message based on the first scrambling sequence, the second downlink control information message scheduling second resources of the downlink shared channel for a data message; and receive the data message in the second resources scheduled by the second downlink control information message.

The transceiver 1015 may communicate bi-directionally, via one or more antennas, wired, or wireless links as described above. For example, the transceiver 1015 may represent a wireless transceiver and may communicate bi-directionally with another wireless transceiver. The transceiver 1015 may also include a modem to modulate the packets and provide the modulated packets to the antennas for transmission, and to demodulate packets received from the antennas.

In some cases, the wireless device may include a single antenna 1020. However, in some cases the device may have more than one antenna 1020, which may be capable of concurrently transmitting or receiving multiple wireless transmissions.

The memory 1025 may include random-access memory (RAM) and read-only memory (ROM). The memory 1025 may store computer-readable, computer-executable code 1030 including instructions that, when executed, cause the processor to perform various functions described herein. In some cases, the memory 1025 may contain, among other things, a basic input/output system (BIOS) which may control basic hardware or software operation such as the interaction with peripheral components or devices.

The code 1030 may include instructions to implement aspects of the present disclosure, including instructions to support wireless communications. The code 1030 may be stored in a non-transitory computer-readable medium such as system memory or other type of memory. In some cases, the code 1030 may not be directly executable by the processor 1035 but may cause a computer (e.g., when compiled and executed) to perform functions described herein.

The processor 1035 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1035 may be configured to operate a memory array using a memory controller. In other cases, a memory controller may be integrated into the processor 1035. The processor 1035 may be configured to execute computer-readable instructions stored in a memory (e.g., the memory 1025) to cause the device 1005 to perform various functions (e.g., functions or tasks supporting scrambling methods for piggybacked downlink control information).

By including or configuring the communication manager 1010 in accordance with examples as described herein, the device 1005 (e.g., a processor controlling or otherwise coupled to the communication manager 1010, the transceiver 1015, the antenna 1020, the memory 1025 (e.g., including code 1030), the processor 1035, the bus 1040, or any combination thereof) may support techniques for the device 1005 to reduce control channel monitoring density while mitigating intercell interference. For instance, by receiving the second downlink control information message over the first resources scheduled by the first downlink control message, the device 1005 may reduce control channel monitoring density. Reducing control channel monitoring density may reduce power consume by the device 1005. Additionally, by receiving the second downlink control information message using the first UE-specific scrambling sequence, the device 1005 may mitigate intercell interference.

Figure 11:
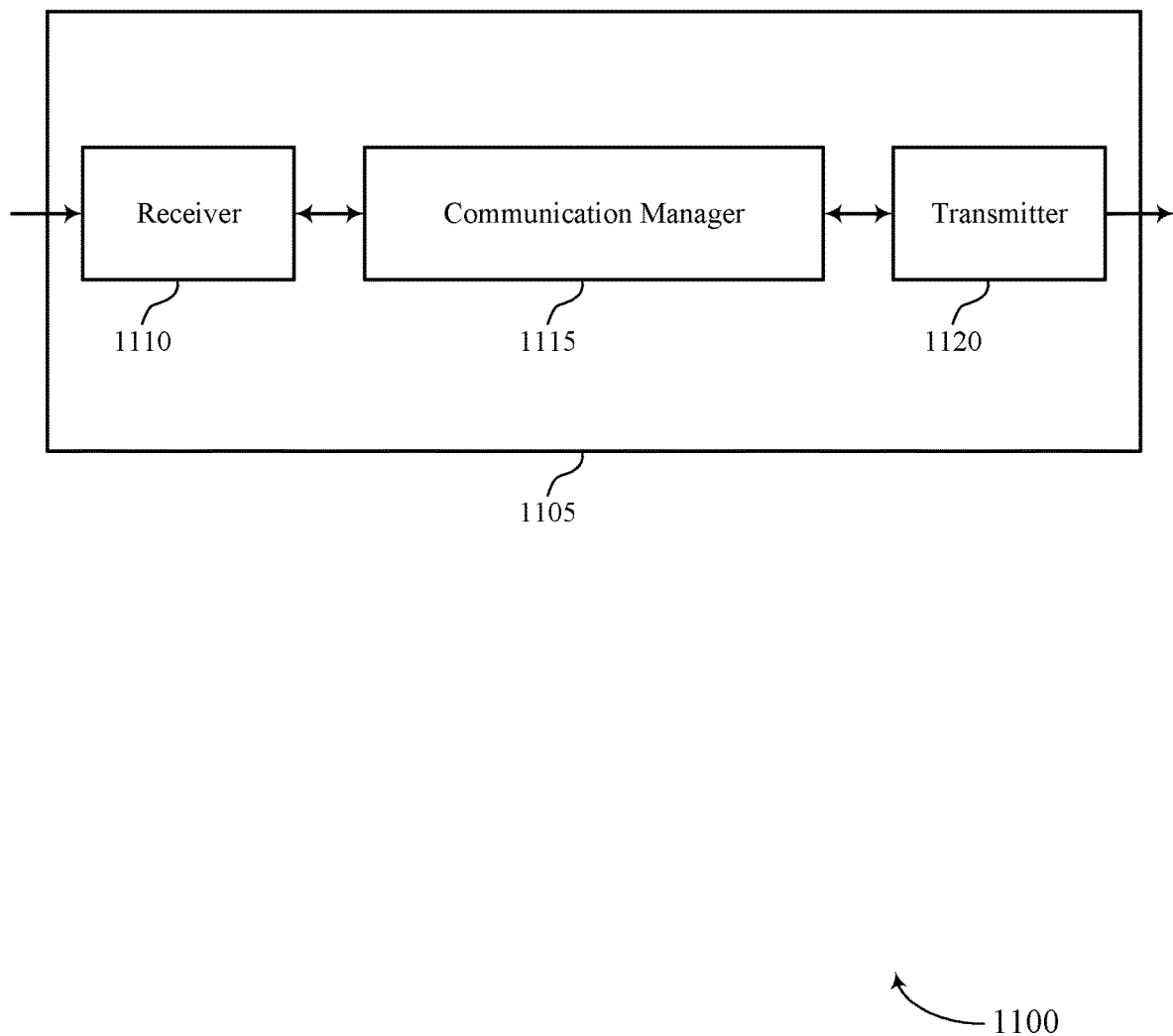
FIGS. 11 and 12 show block diagrams of devices that support scrambling methods for piggybacked downlink control information in accordance with aspects of the present disclosure.

FIG. 11 shows a block diagram 1100 of a device 1105 that supports scrambling methods for piggybacked downlink control information in accordance with aspects of the present disclosure. The device 1105 may be an example of aspects of a base station 105 as described herein. The device 1105 may include a receiver 1110, a communication manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to scrambling methods for piggybacked downlink control information, etc.). Information may be passed on to other components of the device 1105. The receiver 1110 may be an example of aspects of the transceiver 1420 described with reference to FIG. 14. The receiver 1110 may utilize a single antenna or a set of antennas.

The communication manager 1115 may transmit a first downlink control information message in a downlink control channel to a first UE, the first downlink control information message scheduling first resources of a downlink shared channel for a second downlink control information message for the first UE; identify a first scrambling sequence for the second downlink control information message, the first scrambling sequence initialized based on an identifier of the first UE; transmit the second downlink control information message based on the first scrambling sequence, the second downlink control information message scheduling second resources of the downlink shared channel for a data message for the first UE; and transmit the data message in the second resources scheduled by the second downlink control information message. The communication manager 1115 may be an example of aspects of the communication manager 1410 described herein.

By including or configuring the communication manager 1115 in accordance with examples as described herein, the device 1105 (e.g., a processor controlling or otherwise coupled to the receiver 1110, the transmitter 1120, the communication manager 1115, or a combination thereof) may support techniques for the device 1105 to reduce control channel monitoring density while mitigating intercell interference. For instance, by transmitting the second downlink control information message over the first resources scheduled by the first downlink control message, the device 1105 may reduce control channel monitoring density for a UE with which the device 1105 communicates.

Reducing control channel monitoring density may reduce power consumed by the UE which communicates with the device 1105. Additionally, by transmitting the second downlink control information message using the first UE-specific scrambling sequence, the device 1105 may mitigate intercell interference.

The communication manager 1115, or its sub-components, may be implemented in hardware, code (e.g., software or firmware) executed by a processor, or any combination thereof. If implemented in code executed by a processor, the functions of the communication manager 1115, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communication manager 1115, or its sub-components, may be physically located at various positions, including being distributed such that portions of functions are implemented at different physical locations by one or more physical components. In some examples, the communication manager 1115, or its sub-components, may be a separate and distinct component in accordance with various aspects of the present disclosure. In some examples, the communication manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
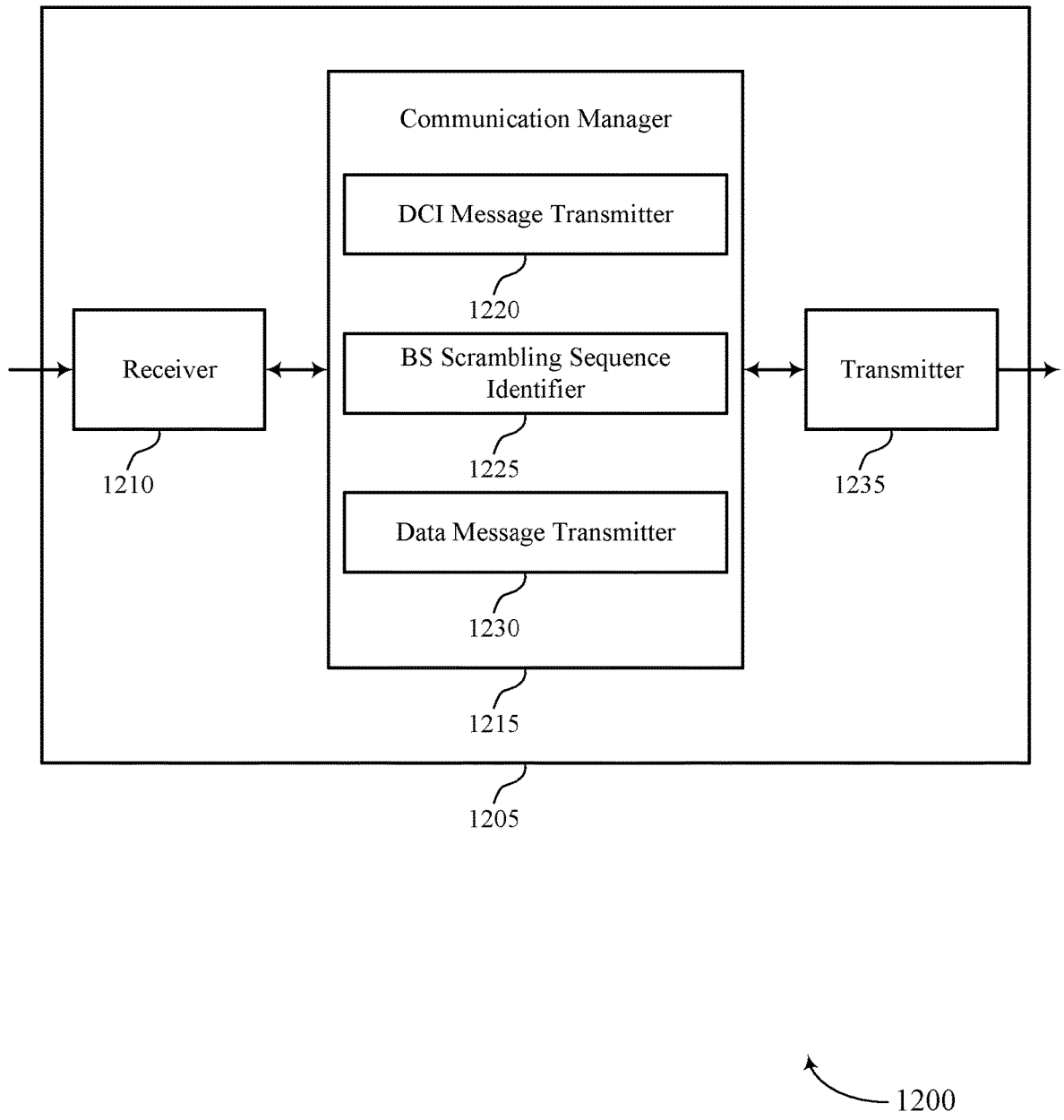

FIG. 12 shows a block diagram 1200 of a device 1205 that supports scrambling methods for piggybacked downlink control information in accordance with aspects of the present disclosure. The device 1205 may be an example of aspects of a device 1105, or a base station 105 as described herein. The device 1205 may include a receiver 1210, a communication manager 1215, and a transmitter 1235. The device 1205 may also include a processor. Each of these components may be in communication with one another (e.g., via one or more buses).

The receiver 1210 may receive information such as packets, user data, or control information associated with various information channels (e.g., control channels, data channels, and information related to scrambling methods for piggybacked downlink control information, etc.). Information may be passed on to other components of the device 1205. The receiver 1210 may be an example of aspects of the transceiver 1420 described with reference to FIG. 14. The receiver 1210 may utilize a single antenna or a set of antennas.

The communication manager 1215 may be an example of aspects of the communication manager 1115 as described herein. The communication manager 1215 may include a DCI message transmitter 1220, a BS scrambling sequence identifier 1225, and a data message transmitter 1230. The communication manager 1215 may be an example of aspects of the communication manager 1410 described herein.

The DCI message transmitter 1220 may transmit a first downlink control information message in a downlink control channel to a first UE, the first downlink control information message scheduling first resources of a downlink shared channel for a second downlink control information message for the first UE. Additionally, the DCI message transmitter 1220 may transmit the second downlink control information message based on a first scrambling sequence, the second downlink control information message scheduling second resources of the downlink shared channel for a data message for the first UE.

The BS scrambling sequence identifier 1225 may identify the first scrambling sequence for the second downlink control information message, the first scrambling sequence initialized based on an identifier of the first UE.

The data message transmitter 1230 may transmit the data message in the second resources scheduled by the second downlink control information message.

The transmitter 1235 may transmit signals generated by other components of the device 1205. In some examples, the transmitter 1235 may be collocated with a receiver 1210 in a transceiver module. For example, the transmitter 1235 may be an example of aspects of the transceiver 1420 described with reference to FIG. 14. The transmitter 1235 may utilize a single antenna or a set of antennas.

Figure 13:
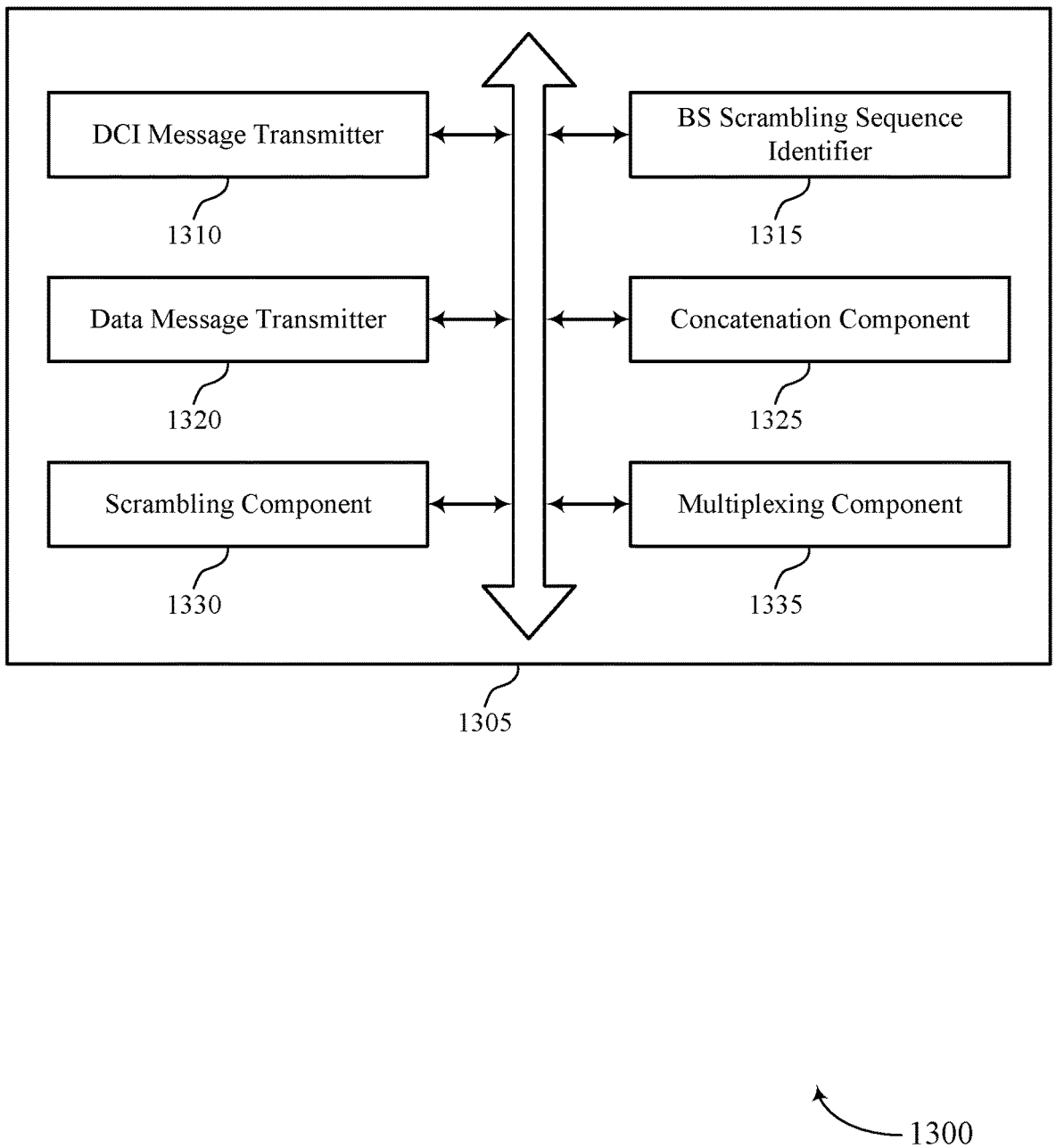
FIG. 13 shows a block diagram of a communication manager that supports scrambling methods for piggybacked downlink control information in accordance with aspects of the present disclosure.

FIG. 13 shows a block diagram 1300 of a communication manager 1305 that supports scrambling methods for piggybacked downlink control information in accordance with aspects of the present disclosure. The communication manager 1305 may be an example of aspects of a communication manager 1115, a communication manager 1215, or a communication manager 1410 described herein. The communication manager 1305 may include a DCI message transmitter 1310, a BS scrambling sequence identifier 1315, a data message transmitter 1320, a concatenation component 1325, a scrambling component 1330, and a multiplexing component 1335. Each of these modules may communicate, directly or indirectly, with one another (e.g., via one or more buses).

The DCI message transmitter 1310 may transmit a first downlink control information message in a downlink control channel to a first UE, the first downlink control information message scheduling first resources of a downlink shared channel for a second downlink control information message for the first UE. In some examples, the DCI message transmitter 1310 may transmit the second downlink control information message based on a first scrambling sequence, the second downlink control information message scheduling second resources of the downlink shared channel for a data message for the first UE.

The BS scrambling sequence identifier 1315 may identify the first scrambling sequence for the second downlink control information message, the first scrambling sequence initialized based on an identifier of the first UE. In some examples, the first scrambling sequence may be associated with a C-RNTI of the first UE, a CS-RNTI of the first UE, or an MCS-RNTI of the first UE.

The data message transmitter 1320 may transmit the data message in the second resources scheduled by the second downlink control information message.

The concatenation component 1325 may concatenate the second downlink control information message with one or more additional downlink control messages to form a set of downlink control information messages. In some examples, the concatenation component 1325 may concatenate the scrambled second downlink control information message with the scrambled one or more additional downlink control information messages to form a set of scrambled downlink control information messages, where transmitting the second downlink control information message includes transmitting the set of scrambled downlink control information messages.

In some examples, the one or more additional downlink control information messages may include a third downlink control information message scrambled according to a second scrambling sequence. In some examples, the third downlink control information message may include a medium reservation indication associated with the first UE and at least one additional UE. In some examples, the third downlink control information message may be for a second UE and the second scrambling sequence may be initialized based on an identifier of the second UE. In some examples, the first scrambling sequence and the second scrambling sequence may be initialized using the identifier of the first UE. In some examples, the second scrambling sequence may be initialized based on a common identifier associated with the first UE and one or more additional UEs.

The scrambling component 1330 may scramble the set of downlink control information messages according to the first scrambling sequence, where transmitting the second downlink control information message includes transmitting the set of scrambled downlink control information messages. In some examples, the scrambling component 1330 may scramble the second downlink control information message and the second data message according to the first scrambling sequence based on the multiplexing, where the transmitting includes transmitting the scrambled second data message in the first resources.

In some examples, the scrambling component 1330 may scramble the second downlink control information message according to the first scrambling sequence. In some examples, the scrambling component 1330 may scramble one or more additional downlink control information messages according to respective scrambling sequences. In some examples, the scrambling component 1330 may scramble the third downlink control information message according to a second scrambling sequence. In some examples, the scrambling component 1330 may scramble the second downlink control information message according to the first scrambling sequence. In some examples, the scrambling component 1330 may scramble a second data message according to a second scrambling sequence. In some examples, the second scrambling sequence may be initialized based on the identifier of the first UE. In some examples, the second scrambling sequence may be initialized based on a second identifier of the first UE. In some examples, the second scrambling sequence may be initialized based on a second identifier of a second UE.

The multiplexing component 1335 may multiplex the second downlink control information message with a second data message for the first UE. In some examples, multiplex the scrambled second data message with the scrambled second downlink control information message, where the transmitting includes transmitting the scrambled second data message in the first resources.

Figure 14:
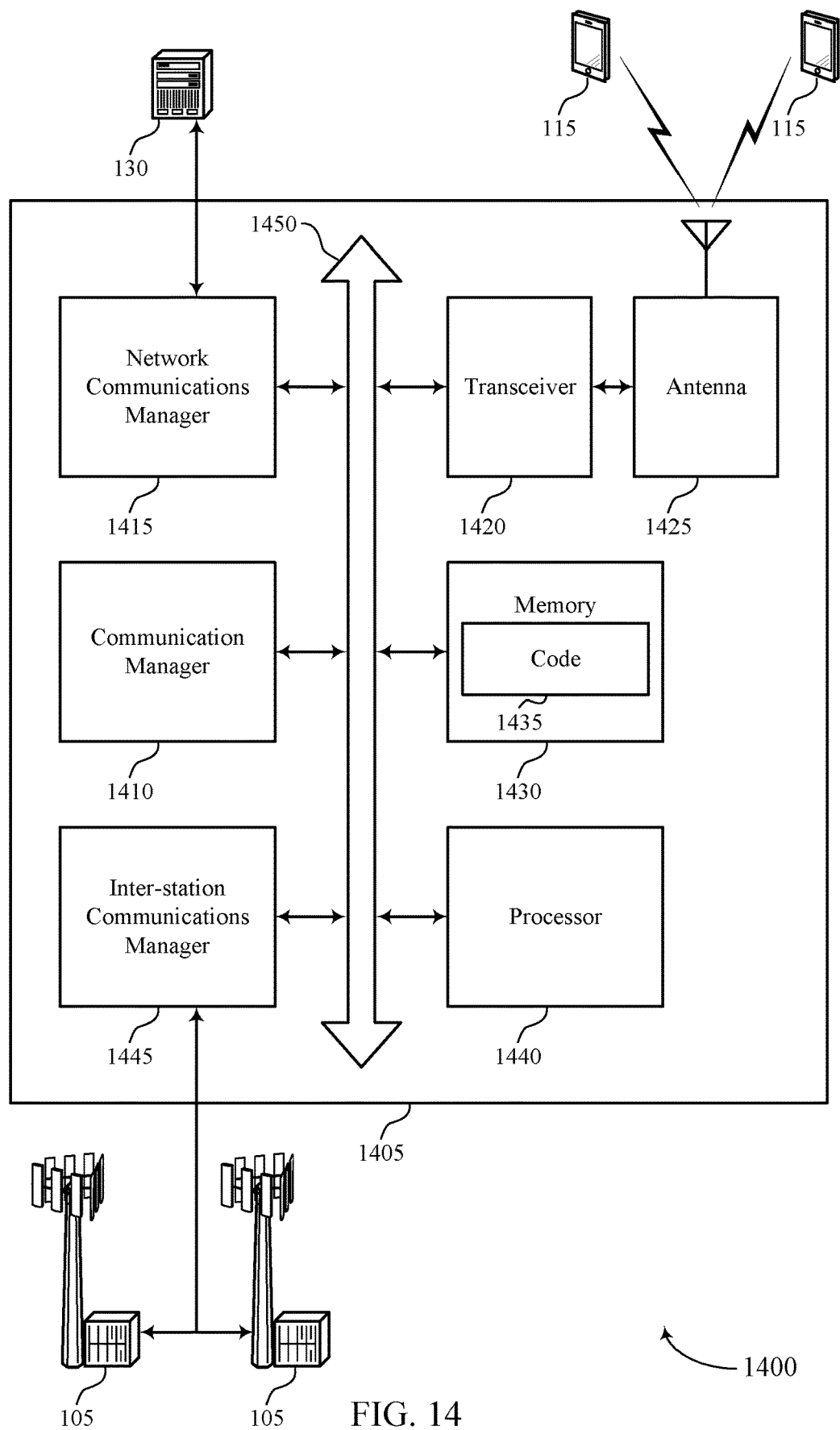
FIG. 14 shows a diagram of a system including a device that supports scrambling methods for piggybacked downlink control information in accordance with aspects of the present disclosure.

FIG. 14 shows a diagram of a system 1400 including a device 1405 that supports scrambling methods for piggy-backed downlink control information in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a communication manager 1410, a network communications manager 1415, a transceiver 1420, an antenna 1425, memory 1430, a processor 1440, and an inter-station communications manager 1445. These components may be in electronic communication via one or more buses (e.g., bus 1450).

The communication manager 1410 may transmit a first downlink control information message in a downlink control channel to a first UE, the first downlink control information message scheduling first resources of a downlink shared channel for a second downlink control information message for the first UE; identify a first scrambling sequence for the second downlink control information message, the first scrambling sequence initialized based on an identifier of the first UE; transmit the second downlink control information message based on the first scrambling sequence, the second downlink control information message scheduling second resources of the downlink shared channel for a data message for the first UE; and transmit the data message in the second resources scheduled by the second downlink control information message.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM and ROM. The memory 1430 may store computer-readable, computer-executable code 1435 including instructions that, when executed, cause the processor to perform various functions described herein. In some cases, the memory 1430 may contain, among other things, a BIOS which may control basic hardware or software operation such as the interaction with peripheral components or devices.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting scrambling methods for piggybacked downlink control information).

The inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

By including or configuring the communication manager 1410 in accordance with examples as described herein, the device 1405 (e.g., a processor controlling or otherwise coupled to the communication manager 1410, the network communications manager 1415, the transceiver 1420, the antenna 1425, the memory 1430 (including code 1435), the process 1440, the inter-station communications manager 1445, or any combination thereof) may support techniques for the device 1405 to reduce control channel monitoring density while mitigating intercell interference. For instance, by transmitting the second downlink control information message over the first resources scheduled by the first downlink control message, the device 1405 may reduce control channel monitoring density for a UE with which the device 1405 communicates. Reducing control channel monitoring density may reduce power consumed by the UE which communicates with the device 1405. Additionally, by transmitting the second downlink control information message using the first UE-specific scrambling sequence, the device 1405 may mitigate intercell interference.

Figure 15:
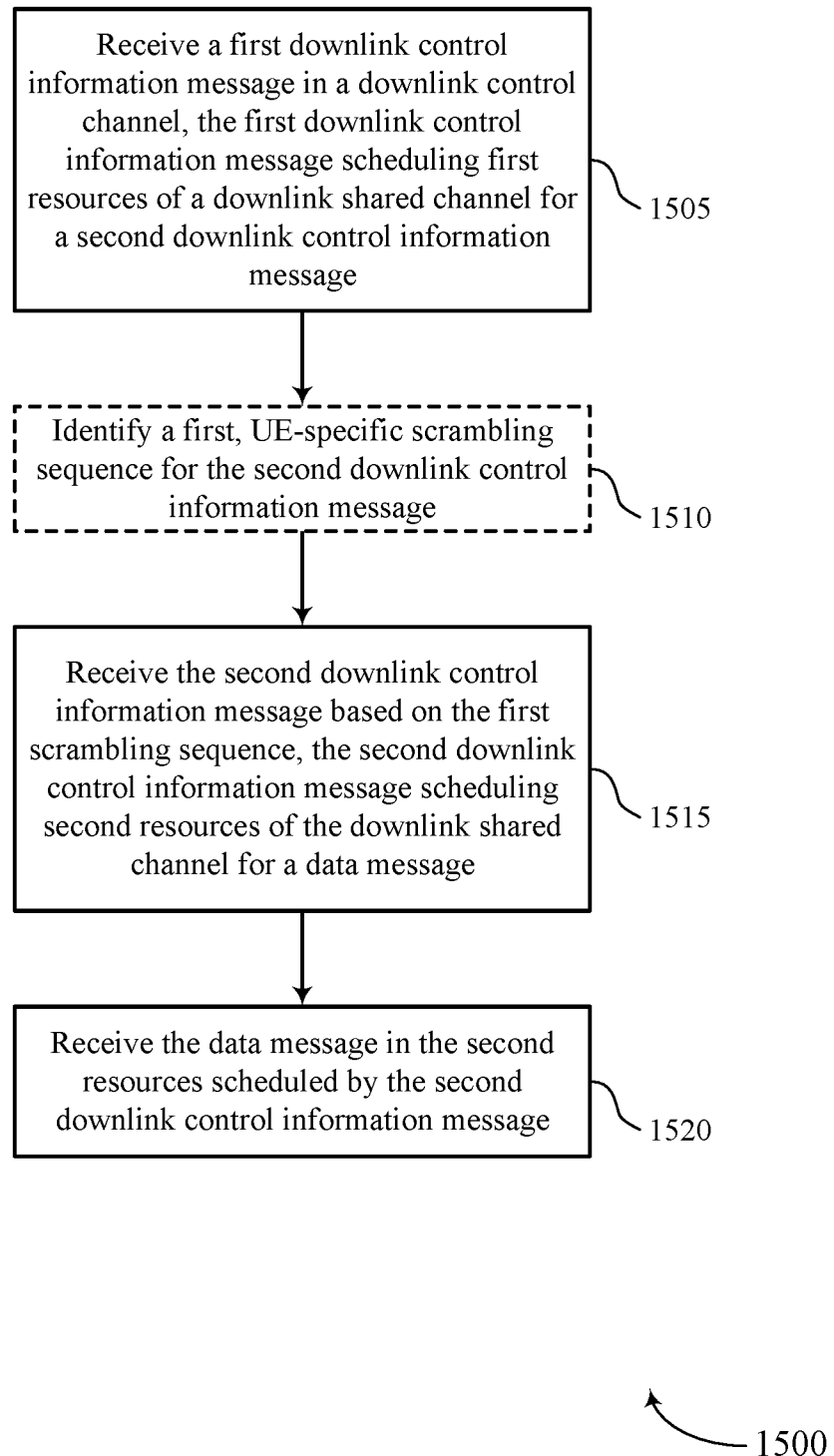
FIGS. 15 through 18 show flowcharts illustrating methods that support scrambling methods for piggybacked downlink control information in accordance with aspects of the present disclosure.

FIG. 15 shows a flowchart illustrating a method 1500 that supports scrambling methods for piggybacked downlink control information in accordance with aspects of the present disclosure. The operations of method 1500 may be implemented by a UE 115 or its components as described herein. For example, the operations of method 1500 may be performed by a communication manager as described with reference to FIGS. 7 through 10. In some examples, a UE may execute a set of instructions to control the functional elements of the UE to perform the described functions. Additionally or alternatively, a UE may perform aspects of the described functions using special-purpose hardware.

At 1505, the UE may receive a first downlink control information message in a downlink control channel, the first downlink control information message scheduling first resources of a downlink shared channel for a second downlink control information message. The operations of 1505 may be performed according to the methods described herein. In some examples, aspects of the operations of 1505 may be performed by a DCI message receiver as described with reference to FIGS. 7 through 10.

At 1510, the UE may identify a first, UE-specific scrambling sequence for the second downlink control information message. The operations of 1510 may be performed according to the methods described herein. In some examples, aspects of the operations of 1510 may be performed by a UE scrambling sequence identifier as described with reference to FIGS. 7 through 10.

At 1515, the UE may receive the second downlink control information message based on the first scrambling sequence, the second downlink control information message scheduling second resources of the downlink shared channel for a data message. The operations of 1515 may be performed according to the methods described herein. In some examples, aspects of the operations of 1515 may be performed by a DCI message receiver as described with reference to FIGS. 7 through 10.

At 1520, the UE may receive the data message in the second resources scheduled by the second downlink control information message. The operations of 1520 may be performed according to the methods described herein. In some examples, aspects of the operations of 1520 may be performed by a data message receiver as described with reference to FIGS. 7 through 10.

Figure 16:
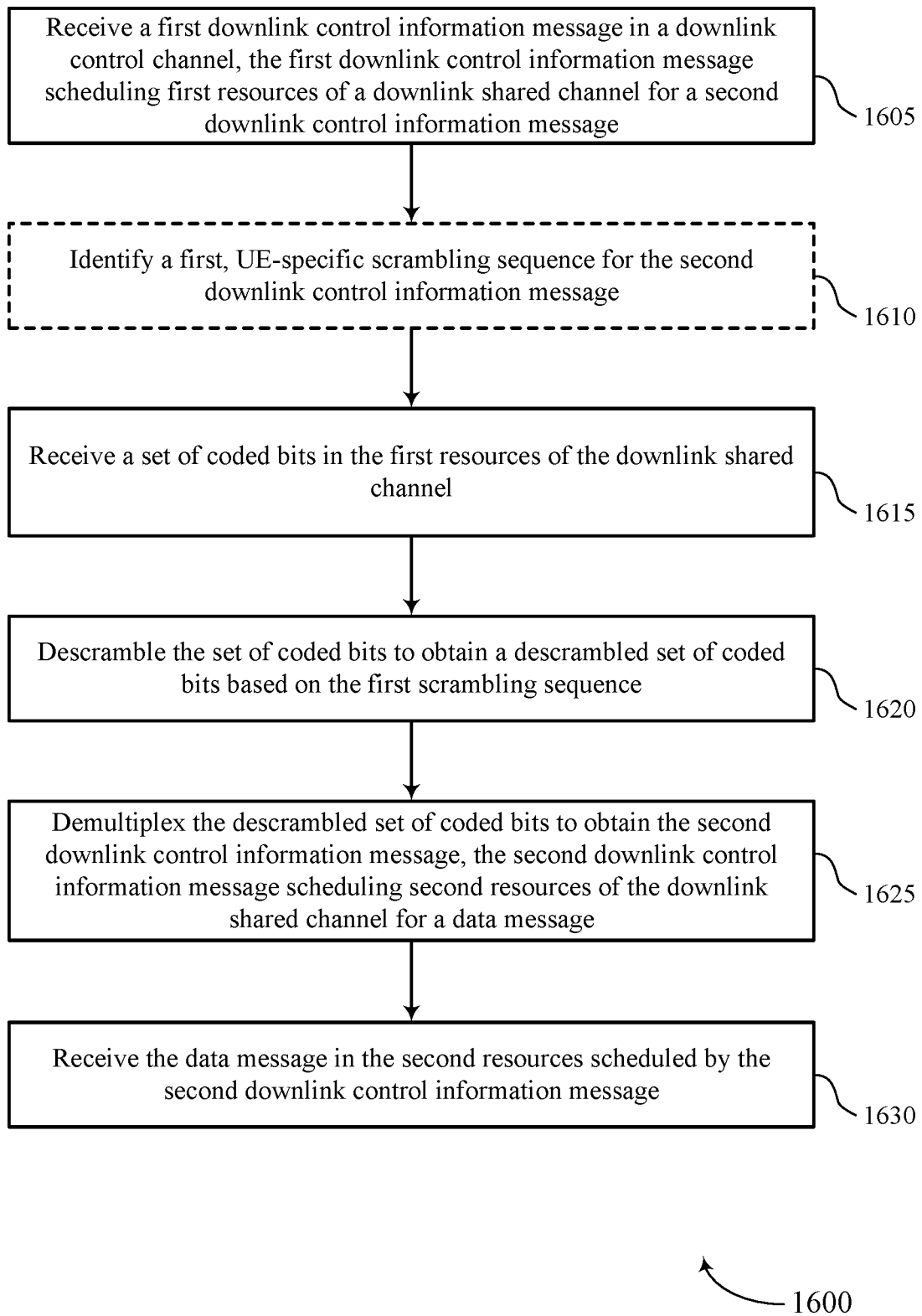

FIG. 16 shows a flowchart illustrating a method 1600 that supports scrambling methods for piggybacked downlink control information in accordance with aspects of the present disclosure. The operations of method 1600 may be implemented by a UE 115 or its components as described herein. For example, the operations of method 1600 may be performed by a communication manager as described with reference to FIGS. 7 through 10. In some examples, a UE may execute a set of instructions to control the functional elements of the UE to perform the described functions. Additionally or alternatively, a UE may perform aspects of the described functions using special-purpose hardware.

At 1605, the UE may receive a first downlink control information message in a downlink control channel, the first downlink control information message scheduling first resources of a downlink shared channel for a second downlink control information message. The operations of 1605 may be performed according to the methods described herein. In some examples, aspects of the operations of 1605 may be performed by a DCI message receiver as described with reference to FIGS. 7 through 10.

At 1610, the UE may identify a first, UE-specific scrambling sequence for the second downlink control information message. The operations of 1610 may be performed according to the methods described herein. In some examples, aspects of the operations of 1610 may be performed by a UE scrambling sequence identifier as described with reference to FIGS. 7 through 10.

At 1615, the UE may receive a set of coded bits in the first resources of the downlink shared channel. The operations of 1615 may be performed according to the methods described herein. In some examples, aspects of the operations of 1615 may be performed by a DCI message receiver as described with reference to FIGS. 7 through 10.

At 1620, the UE may descramble the set of coded bits to obtain a descrambled set of coded bits based on the first scrambling sequence. The operations of 1620 may be performed according to the methods described herein. In some examples, aspects of the operations of 1620 may be performed by a descrambling component as described with reference to FIGS. 7 through 10.

At 1625, the UE may demultiplex the descrambled set of coded bits to obtain the second downlink control information message, the second downlink control information message scheduling second resources of the downlink shared channel for a data message. The operations of 1625 may be performed according to the methods described herein. In some examples, aspects of the operations of 1625 may be performed by a demultiplexing component as described with reference to FIGS. 7 through 10.

At 1630, the UE may receive the data message in the second resources scheduled by the second downlink control information message. The operations of 1630 may be performed according to the methods described herein. In some examples, aspects of the operations of 1630 may be performed by a data message receiver as described with reference to FIGS. 7 through 10.

Figure 17:
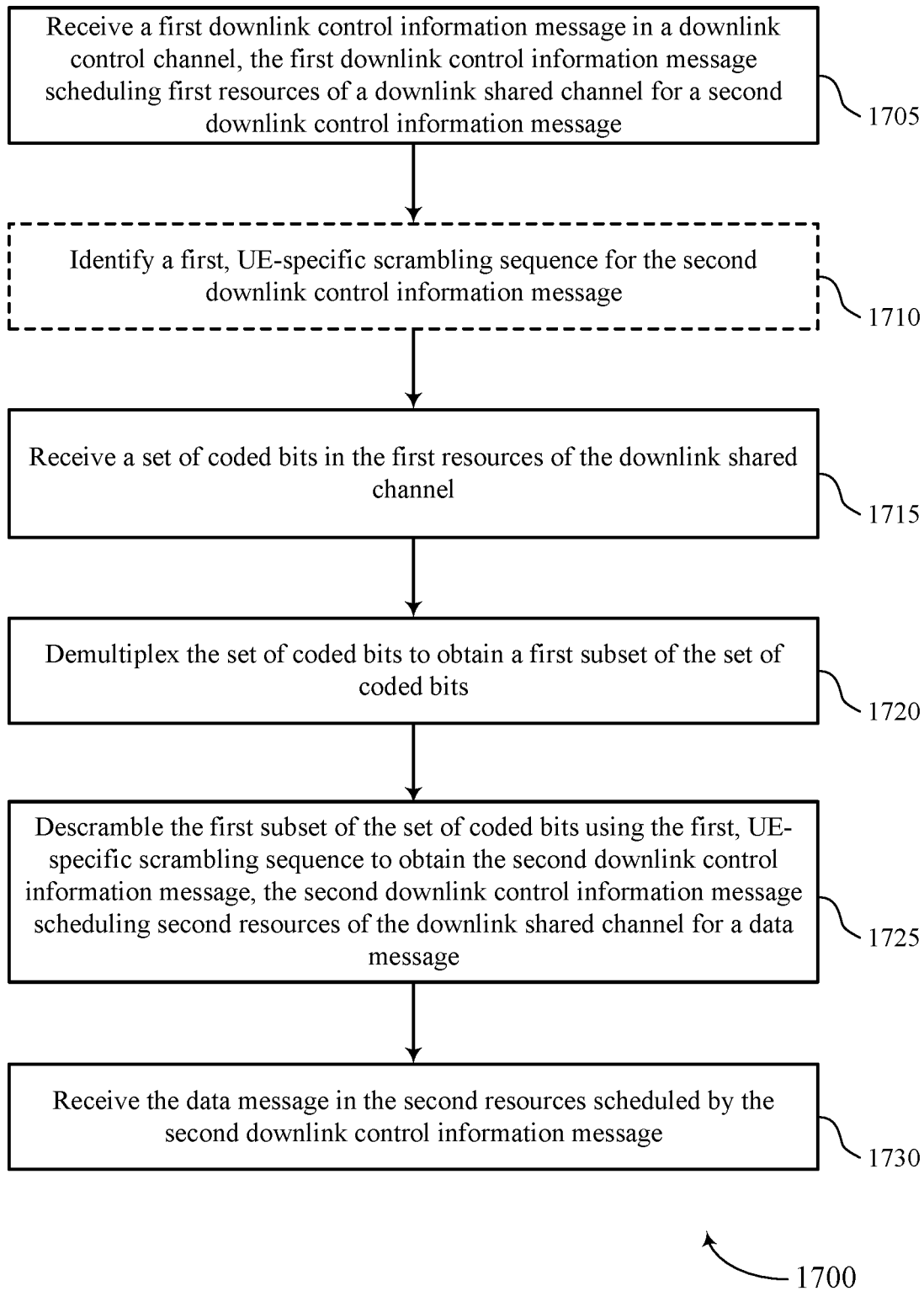

FIG. 17 shows a flowchart illustrating a method 1700 that supports scrambling methods for piggybacked downlink control information in accordance with aspects of the present disclosure. The operations of method 1700 may be implemented by a UE 115 or its components as described herein. For example, the operations of method 1700 may be performed by a communication manager as described with reference to FIGS. 7 through 10. In some examples, a UE may execute a set of instructions to control the functional elements of the UE to perform the described functions. Additionally or alternatively, a UE may perform aspects of the described functions using special-purpose hardware.

At 1705, the UE may receive a first downlink control information message in a downlink control channel, the first downlink control information message scheduling first resources of a downlink shared channel for a second downlink control information message. The operations of 1705 may be performed according to the methods described herein. In some examples, aspects of the operations of 1705 may be performed by a DCI message receiver as described with reference to FIGS. 7 through 10.

At 1710, the UE may identify a first, UE-specific scrambling sequence for the second downlink control information message. The operations of 1710 may be performed according to the methods described herein. In some examples, aspects of the operations of 1710 may be performed by a UE scrambling sequence identifier as described with reference to FIGS. 7 through 10.

At 1715, the UE may receive a set of coded bits in the first resources of the downlink shared channel. The operations of 1715 may be performed according to the methods described herein. In some examples, aspects of the operations of 1715 may be performed by a DCI message receiver as described with reference to FIGS. 7 through 10.

At 1720, the UE may demultiplex the set of coded bits to obtain a first subset of the set of coded bits. The operations of 1720 may be performed according to the methods described herein. In some examples, aspects of the operations of 1720 may be performed by a demultiplexing component as described with reference to FIGS. 7 through 10.

At 1725, the UE may descramble the first subset of the set of coded bits using the first UE-specific scrambling sequence to obtain the second downlink control information message, the second downlink control information message scheduling second resources of the downlink shared channel for a data message. The operations of 1725 may be performed according to the methods described herein. In some examples, aspects of the operations of 1725 may be performed by a descrambling component as described with reference to FIGS. 7 through 10.

At 1730, the UE may receive the data message in the second resources scheduled by the second downlink control information message. The operations of 1730 may be performed according to the methods described herein. In some examples, aspects of the operations of 1730 may be performed by a data message receiver as described with reference to FIGS. 7 through 10.

Figure 18:
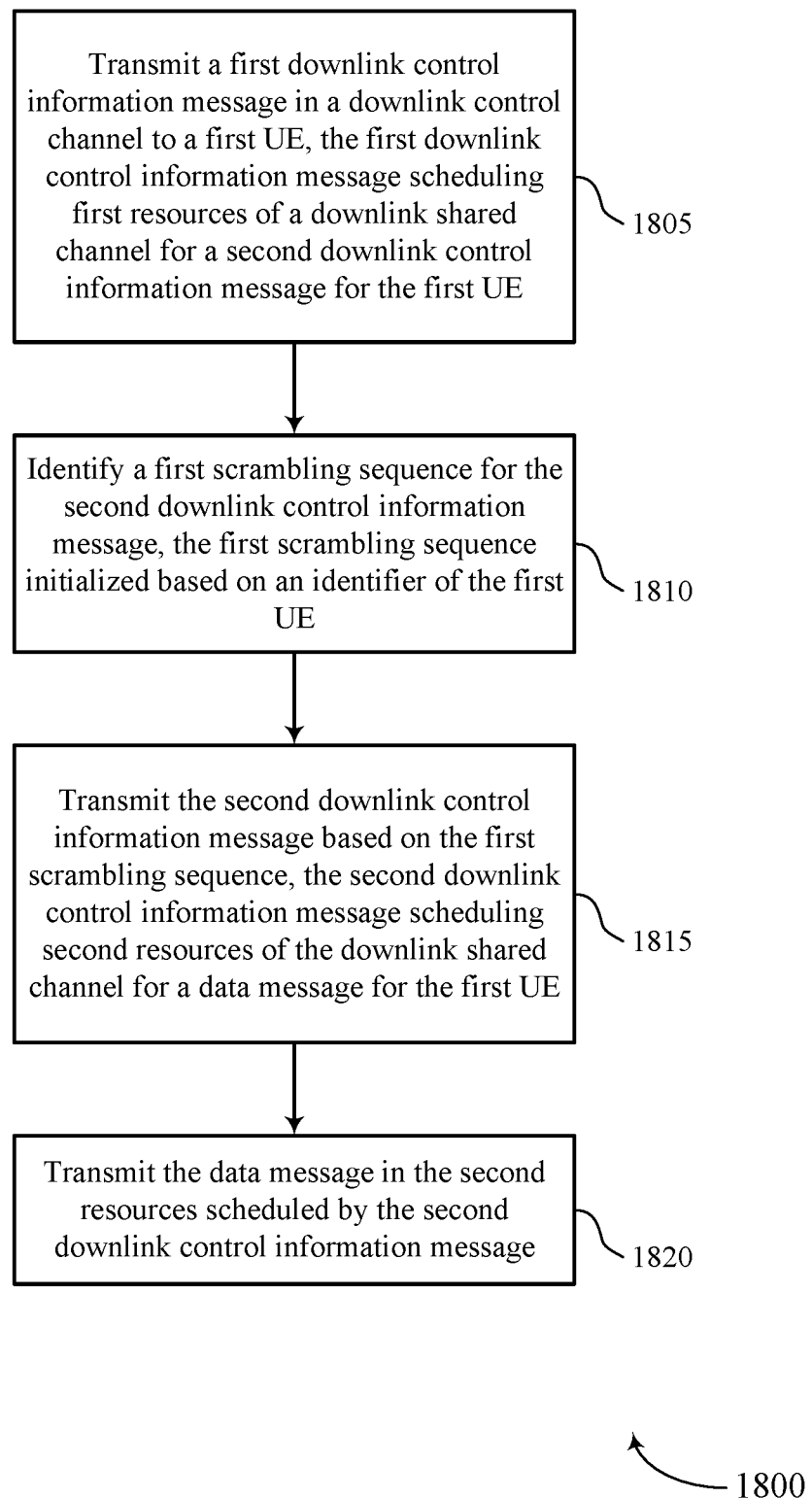

FIG. 18 shows a flowchart illustrating a method 1800 that supports scrambling methods for piggybacked downlink control information in accordance with aspects of the present disclosure. The operations of method 1800 may be implemented by a base station 105 or its components as described herein. For example, the operations of method 1800 may be performed by a communication manager as described with reference to FIGS. 11 through 14. In some examples, a base station may execute a set of instructions to control the functional elements of the base station to perform the described functions. Additionally or alternatively, a base station may perform aspects of the described functions using special-purpose hardware.

At 1805, the base station may transmit a first downlink control information message in a downlink control channel to a first UE, the first downlink control information message scheduling first resources of a downlink shared channel for a second downlink control information message for the first UE. The operations of 1805 may be performed according to the methods described herein. In some examples, aspects of the operations of 1805 may be performed by a DCI message transmitter as described with reference to FIGS. 11 through 14.

At 1810, the base station may identify (e.g., determine) a first scrambling sequence for the second downlink control information message, the first scrambling sequence initialized based on an identifier of the first UE. The operations of 1810 may be performed according to the methods described herein. In some examples, aspects of the operations of 1810 may be performed by a BS scrambling sequence identifier as described with reference to FIGS. 11 through 14.

At 1815, the base station may transmit the second downlink control information message based on the first scrambling sequence, the second downlink control information message scheduling second resources of the downlink shared channel for a data message for the first UE. The operations of 1815 may be performed according to the methods described herein. In some examples, aspects of the operations of 1815 may be performed by a DCI message transmitter as described with reference to FIGS. 11 through 14.

At 1820, the base station may transmit the data message in the second resources scheduled by the second downlink control information message. The operations of 1820 may be performed according to the methods described herein. In some examples, aspects of the operations of 1820 may be performed by a data message transmitter as described with reference to FIGS. 11 through 14.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication at a UE, comprising: receiving a first downlink control information message in a downlink control channel, the first downlink control information message scheduling first resources of a downlink shared channel for a second downlink control information message; receiving the second downlink control information message based at least in part on a first, UE-specific scrambling sequence, the second downlink control information message scheduling second resources of the downlink shared channel for a data message; and receiving the data message in the second resources scheduled by the second downlink control information message.

Aspect 2: The method of aspect 1, wherein receiving the second downlink control information message comprises receiving a set of coded bits in the first resources of the downlink shared channel, the method further comprising: descrambling the set of coded bits to obtain a descrambled set of coded bits; and demultiplexing the descrambled set of coded bits to obtain the second downlink control information message.

Aspect 3: The method of aspect 2, wherein the first downlink control information message also schedules the first resources for a second data message, and wherein the demultiplexing the descrambled set of coded bits further comprises: demultiplexing the descrambled set of coded bits received in the first resources to obtain a descrambled second data message.

Aspect 4: The method of aspect 3, wherein the first scrambling sequence is associated with a cell radio network temporary identifier of the UE, a configured scheduling radio network temporary identifier of the UE, or a modulation coding scheme radio network temporary identifier of the UE.

Aspect 5: The method of any of aspects 1 through 4, wherein receiving the second downlink control information message comprises receiving a set of coded bits in the first resources of the downlink shared channel, the method further comprising: demultiplexing the set of coded bits to obtain a first subset of the set of coded bits; and descrambling the first subset of the set of coded bits using the first, UE-specific scrambling sequence to obtain the second downlink control information message.

Aspect 6: The method of aspect 5, wherein demultiplexing the set of coded bits comprises: demultiplexing the set of coded bits to obtain the first subset of the set of coded bits and a second subset of the set of coded bits.

Aspect 7: The method of aspect 6, further comprising: descrambling the second subset of the set of coded bits using a second scrambling sequence to obtain a third downlink control information message.

Aspect 8: The method of aspect 7, wherein the third downlink control information message schedules third resources of the downlink shared channel for a second data message.

Aspect 9: The method of any of aspects 7 through 8, wherein the third downlink control information message comprises a medium reservation indication associated with the UE and at least one additional UE.

Aspect 10: The method of any of aspects 7 through 9, wherein the first scrambling sequence and the second scrambling sequence are initialized using a same identifier of the UE.

Aspect 11: The method of any of aspects 7 through 10, wherein the second scrambling sequence is initialized based at least in part on a common identifier associated with the UE and one or more additional UEs.

Aspect 12: The method of any of aspects 6 through 11, wherein the first downlink control information message also schedules the first resources for a second data message, and further comprising: descrambling the second subset of the set of coded bits using a second, UE-specific scrambling sequence to obtain the second data message.

Aspect 13: The method of aspect 12, and wherein the first scrambling sequence and the second scrambling sequence are initialized using a same identifier of the UE.

Aspect 14: The method of any of aspects 12 through 13, wherein the first scrambling sequence and the second scrambling sequence are initialized using different identifiers of the UE.

Aspect 15: A method for wireless communication at a base station, comprising: transmitting a first downlink control information message in a downlink control channel to a first UE, the first downlink control information message scheduling first resources of a downlink shared channel for a second downlink control information message for the first UE; determining a first scrambling sequence for the second downlink control information message, the first scrambling sequence initialized based at least in part on an identifier of the first UE; transmitting the second downlink control information message based at least in part on the first scrambling sequence, the second downlink control information message scheduling second resources of the downlink shared channel for a data message for the first UE; and transmitting the data message in the second resources scheduled by the second downlink control information message.

Aspect 16: The method of aspect 15, further comprising: concatenating the second downlink control information message with one or more additional downlink control messages to form a plurality of downlink control information messages; and scrambling the plurality of downlink control information messages according to the first scrambling sequence, wherein transmitting the second downlink control information message comprises transmitting the plurality of scrambled downlink control information messages.

Aspect 17: The method of any of aspects 15 through 16, further comprising: multiplexing the second downlink control information message with a second data message for the first UE; and scrambling the second downlink control information message and the second data message according to the first scrambling sequence based at least in part on the multiplexing, wherein the transmitting comprises transmitting the scrambled second data message in the first resources.

Aspect 18: The method of any of aspects 15 through 17, wherein the first scrambling sequence is associated with a cell radio network temporary identifier of the first UE, a configured scheduling radio network temporary identifier of the first UE, or a modulation coding scheme radio network temporary identifier of the first UE.

Aspect 19: The method of any of aspects 15 through 18, further comprising: scrambling the second downlink control information message according to the first scrambling sequence; scrambling one or more additional downlink control information messages according to respective scrambling sequences; and concatenating the scrambled second downlink control information message with the scrambled one or more additional downlink control information messages to form a plurality of scrambled downlink control information messages, wherein transmitting the second downlink control information message comprises transmitting the plurality of scrambled downlink control information messages.

Aspect 20: The method of aspect 19, wherein the one or more additional downlink control information messages comprise a third downlink control information message, and wherein the scrambling comprises: scrambling the third downlink control information message according to a second scrambling sequence.

Aspect 21: The method of aspect 20, wherein the third downlink control information message comprises a medium reservation indication associated with the first UE and at least one additional UE.

Aspect 22: The method of any of aspects 20 through 21, wherein the third downlink control information message is for a second UE and the second scrambling sequence is initialized based at least in part on an identifier of the second UE.

Aspect 23: The method of any of aspects 20 through 22, wherein the first scrambling sequence and the second scrambling sequence are initialized using the identifier of the first UE.

Aspect 24: The method of any of aspects 20 through 23, wherein the second scrambling sequence is initialized based on a common identifier associated with the first UE and one or more additional UEs.

Aspect 25: The method of any of aspects 15 through 24, further comprising: scrambling the second downlink control information message according to the first scrambling sequence; scrambling a second data message according to a second scrambling sequence; and multiplexing the scrambled second data message with the scrambled second downlink control information message, wherein the transmitting comprises transmitting the scrambled second data message in the first resources.

Aspect 26: The method of aspect 25, wherein the second scrambling sequence is initialized based at least in part on the identifier of the first UE.

Aspect 27: The method of any of aspects 25 through 26, wherein the second scrambling sequence is initialized based at least in part on a second identifier of the first UE.

Aspect 28: The method of any of aspects 25 through 27, wherein the second scrambling sequence is initialized based at least in part on a second identifier of a second UE.

Aspect 29: An apparatus for wireless communication at a UE, comprising a processor; memory coupled with the processor; and instructions stored in the memory and executable by the processor to cause the apparatus to perform a method of any of aspects 1 through 14.

Aspect 30: An apparatus for wireless communication at a UE, comprising at least one means for performing a method of any of aspects 1 through 14.

Aspect 31: A non-transitory computer-readable medium storing code for wireless communication at a UE, the code comprising instructions executable by a processor to perform a method of any of aspects 1 through 14.

Aspect 32: An apparatus for wireless communication at a base station, comprising a processor; memory coupled with the processor; and instructions stored in the memory and executable by the processor to cause the apparatus to perform a method of any of aspects 15 through 28.

Aspect 33: An apparatus for wireless communication at a base station, comprising at least one means for performing a method of any of aspects 15 through 28.

Aspect 34: A non-transitory computer-readable medium storing code for wireless communication at a base station, the code comprising instructions executable by a processor to perform a method of any of aspects 15 through 28.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    receiving a first downlink control information message in a downlink control channel, the first downlink control information message scheduling first resources of a downlink shared channel for a second downlink control information message;
    receiving the second downlink control information message based at least in part on a first, UE-specific scrambling sequence, wherein receiving the second downlink control information message comprises receiving a set of coded bits in the first resources of the downlink shared channel the second downlink control information message scheduling second resources of the downlink shared channel for a data message;
    demultiplexing the set of coded bits to obtain a first subset of the set of coded bits and a second subset of the set of coded bits;
    descrambling the first subset of the set of coded bits using the first, UE-specific scrambling sequence to obtain the second downlink control information message and the second subset of the set of coded bits using a second scrambling sequence to obtain a third downlink control information message based at least in part on performing the demultiplexing; and
    receiving the data message in the second resources scheduled by the second downlink control information message.

2. The method of claim 1, wherein the first downlink control information message also schedules the first resources for a second data message, the method further comprising:
    demultiplexing the set of coded bits received in the first resources to obtain a scrambled second data message.

3. The method of claim 1, wherein the first, UE-specific scrambling sequence is determined according to a function seeded by a cell radio network temporary identifier of the UE, a configured scheduling radio network temporary identifier of the UE, or a modulation coding scheme radio network temporary identifier of the UE.

4. The method of claim 1, wherein the first downlink control information message also schedules the first resources for the third downlink control information message, and further comprising:
    receiving a second data message in third resources scheduled by the third downlink control information message.

5. A method for wireless communication at a base station, comprising:
    transmitting a first downlink control information message in a downlink control channel to a first user equipment (UE), the first downlink control information message scheduling first resources of a downlink shared channel for a second downlink control information message for the first UE;
    determining a first scrambling sequence for the second downlink control information message, the first scrambling sequence initialized based at least in part on an identifier of the first UE;
    scrambling the second downlink control information message according to the first scrambling sequence;
    scrambling a third downlink control information message according to a second scrambling sequence;
    concatenating the scrambled second downlink control information message with the scrambled third downlink control information message to form a plurality of scrambled downlink control information messages;
    transmitting the plurality of scrambled downlink control information messages, the second downlink control information message scheduling second resources of the downlink shared channel for a data message for the first UE; and
    transmitting the data message in the second resources scheduled by the second downlink control information message.

6. The method of claim 5, further comprising: multiplexing the plurality of scrambled downlink control information messages with a second data message for the first UE.

7. The method of claim 5, wherein the first scrambling sequence is associated with a cell radio network temporary identifier of the first UE, a configured scheduling radio network temporary identifier of the first UE, or a modulation coding scheme radio network temporary identifier of the first UE.

8. The method of claim 5, further comprising:
    scrambling the second downlink control information message according to the first scrambling sequence;
    scrambling a second data message according to a third scrambling sequence; and
    multiplexing the scrambled second data message with the scrambled second downlink control information message, wherein the transmitting comprises transmitting the scrambled second data message in the first resources.

9. An apparatus for wireless communication at a user equipment (UE), comprising:
one or more processors,
memory in electronic communication with the one or more processors, and
instructions stored in the memory and executable by the one or more processors to cause the apparatus to:
receive a first downlink control information message in a downlink control channel, the first downlink control information message scheduling first resources of a downlink shared channel for a second downlink control information message;
receive the second downlink control information message based at least in part on a first, UE-specific scrambling sequence, wherein receiving the second downlink control information message comprises receiving a set of coded bits in the first resources of the downlink shared channel the second downlink control information message scheduling second resources of the downlink shared channel for a data message;
demultiplex the set of coded bits to obtain a first subset of the set of coded bits and a second subset of the set of coded bits;
descramble the first subset of the set of coded bits using the first, UE-specific scrambling sequence to obtain the second downlink control information message and the second subset of the set of coded bits using a second scrambling sequence to obtain a third downlink control information message based at least in part on performing the demultiplexing; and
receive the data message in the second resources scheduled by the second downlink control information message.

10. The apparatus of claim 9, wherein the first downlink control information message also schedules the first resources for a second data message, and wherein the instructions are further executable by the one or more processors to cause the apparatus to:
demultiplex the set of coded bits received in the first resources to obtain a scrambled second data message.

11. The apparatus of claim 9, wherein the first, UE-specific scrambling sequence is determined according to a function seeded by a cell radio network temporary identifier of the UE, a configured scheduling radio network temporary identifier of the UE, or a modulation coding scheme radio network temporary identifier of the UE.

12. The apparatus of claim 9, wherein the first downlink control information message also schedules the first resources for the third downlink control information message, and wherein the instructions are further executable by the one or more processors to cause the apparatus to:
receive a second data message in third resources scheduled by the third downlink control information message.

13. An apparatus for wireless communication at a base station, comprising:
one or more processors,
memory in electronic communication with the one or more processors, and
instructions stored in the memory and executable by the one or more processors to cause the apparatus to:
transmit a first downlink control information message in a downlink control channel to a first user equipment (UE), the first downlink control information message scheduling first resources of a downlink shared channel for a second downlink control information message for the first UE;
determine a first scrambling sequence for the second downlink control information message, the first scrambling sequence initialized based at least in part on an identifier of the first UE;
scramble the second downlink control information message according to the first scrambling sequence;
scramble a third downlink control information message according to a second scrambling sequence;
concatenate the scrambled second downlink control information message with the scrambled third downlink control information message to form a plurality of scrambled downlink control information messages;
transmit the plurality of scrambled downlink control information messages, the second downlink control information message scheduling second resources of the downlink shared channel for a data message for the first UE; and
transmit the data message in the second resources scheduled by the second downlink control information message.

14. The apparatus of claim 13, wherein the instructions are further executable by the one or more processors to cause the apparatus to: multiplex the plurality of scrambled downlink control information messages with a second data message for the first UE.

15. The apparatus of claim 13, wherein the first scrambling sequence is associated with a cell radio network temporary identifier of the first UE, a configured scheduling radio network temporary identifier of the first UE, or a modulation coding scheme radio network temporary identifier of the first UE.

16. The apparatus of claim 13, wherein the instructions are further executable by the one or more processors to cause the apparatus to:
scramble the second downlink control information message according to the first scrambling sequence;
scramble a second data message according to a third scrambling sequence; and
multiplex the scrambled second data message with the scrambled second downlink control information message, wherein the transmitting are executable by the one or more processors to cause the apparatus to transmit the scrambled second data message in the first resources.

* * * * *